(12) United States Patent  (10) Patent No.: US 9,069,854 B2
Corella et al.  (45) Date of Patent: Jun. 30, 2015

(54) FACILITATING BROWSING OF RESULT SETS

(75) Inventors: Francisco Corella, San Diego, CA (US); Karen Pomian Lewison, San Diego, CA (US)

(73) Assignee: Pomian & Corella, LLC, Carmichael, CA (US)

( * ) Notice: Subject to any disclaimer, the term of this patent is extended or adjusted under 35 U.S.C. 154(b) by 869 days.

(21) Appl. No.: 12/581,851

(22) Filed: Oct. 19, 2009

(65) Prior Publication Data

US 2010/0100836 A1   Apr. 22, 2010

Related U.S. Application Data

(60) Provisional application No. 61/106,570, filed on Oct. 18, 2008, provisional application No. 61/201,855, filed on Dec. 16, 2008.

(51) Int. Cl.
*G06F 3/048* (2013.01)
*G06F 17/30* (2006.01)
*G06Q 30/02* (2012.01)

(52) U.S. Cl.
CPC ...... *G06F 17/30864* (2013.01); *G06Q 30/0256* (2013.01); *G06F 17/30675* (2013.01)

(58) Field of Classification Search
CPC .............. G06F 17/30864; G06F 17/30867; G06F 17/30675; G06F 17/30672; G06F 17/30445; G06F 17/30126; G06F 17/30637; G06F 17/30997; G06F 17/30058; G06F 17/30398; G06F 17/30545; G06F 3/0486

USPC .......................... 715/768, 738, 739; 707/758
See application file for complete search history.

(56) References Cited

U.S. PATENT DOCUMENTS

| | | | |
|---|---|---|---|
| 5,546,528 A | 8/1996 | Johnston | |
| 6,876,997 B1 * | 4/2005 | Rorex et al. | 1/1 |
| 7,792,821 B2 * | 9/2010 | Shakib et al. | 707/714 |
| 7,844,590 B1 * | 11/2010 | Zwicky et al. | 707/706 |
| 8,078,630 B2 * | 12/2011 | Dexter et al. | 707/758 |
| 8,190,623 B2 * | 5/2012 | Bennett | 707/763 |
| 8,423,537 B2 * | 4/2013 | Laakso et al. | 707/722 |
| 8,521,711 B2 * | 8/2013 | Couch et al. | 707/706 |
| 8,914,383 B1 * | 12/2014 | Weinstein et al. | 707/749 |
| 2001/0051943 A1 * | 12/2001 | Drucker et al. | 707/3 |
| 2002/0103789 A1 * | 8/2002 | Turnbull et al. | 707/3 |
| 2002/0107849 A1 * | 8/2002 | Hickey et al. | 707/3 |
| 2002/0198875 A1 * | 12/2002 | Masters | 707/4 |

(Continued)

OTHER PUBLICATIONS

Tan et al., QueReSeek: Community-Based Web Navigation by Reverse Lookup of Search History; © 2008 IEEE; 8 pages.*

(Continued)

*Primary Examiner* — Linh K Pham

(57) ABSTRACT

A method of facilitating the browsing of a plurality of result sets by a user. The method includes displaying a plurality of queries on a computer display, each query having a corresponding result set, the plurality of queries thereby constituting a set of displayed queries, and displaying the result set of a selected displayed query in response to the user selecting the query from the set of displayed queries via a user interface procedure, while continuing to display the set of displayed queries so the user can subsequently select other queries from the set of displayed queries to thereby interleave browsing the result sets of the queries in the set of displayed queries.

27 Claims, 19 Drawing Sheets

(56) References Cited

U.S. PATENT DOCUMENTS

| | | | |
|---|---|---|---|
| 2003/0144924 A1* | 7/2003 | McGee | 705/27 |
| 2004/0054672 A1* | 3/2004 | Tsuchitani et al. | 707/3 |
| 2004/0059729 A1* | 3/2004 | Krupin et al. | 707/3 |
| 2004/0083206 A1* | 4/2004 | Wu et al. | 707/3 |
| 2005/0033641 A1* | 2/2005 | Jha et al. | 705/14 |
| 2005/0071332 A1* | 3/2005 | Ortega et al. | 707/4 |
| 2005/0192833 A1* | 9/2005 | Artinger | 705/1 |
| 2006/0047649 A1* | 3/2006 | Liang | 707/4 |
| 2006/0085741 A1* | 4/2006 | Weiner et al. | 715/517 |
| 2006/0106793 A1* | 5/2006 | Liang | 707/5 |
| 2006/0224554 A1* | 10/2006 | Bailey et al. | 707/1 |
| 2006/0265417 A1* | 11/2006 | Amato et al. | 707/102 |
| 2007/0005576 A1* | 1/2007 | Cutrell et al. | 707/3 |
| 2007/0005645 A1* | 1/2007 | Chase et al. | 707/104.1 |
| 2007/0050335 A1* | 3/2007 | Kashima et al. | 707/3 |
| 2007/0192293 A1* | 8/2007 | Swen | 707/3 |
| 2007/0233556 A1* | 10/2007 | Koningstein | 705/14 |
| 2007/0233691 A1* | 10/2007 | Chaushev | 707/10 |
| 2007/0239676 A1* | 10/2007 | Stonehocker et al. | 707/3 |
| 2007/0294635 A1* | 12/2007 | Craddock et al. | 715/784 |
| 2008/0005118 A1* | 1/2008 | Shakib et al. | 707/10 |
| 2008/0103875 A1* | 5/2008 | Kokernak et al. | 705/10 |
| 2008/0104542 A1* | 5/2008 | Cohen et al. | 715/810 |
| 2008/0235608 A1* | 9/2008 | Prabhu | 715/765 |
| 2008/0288461 A1* | 11/2008 | Glennon et al. | 707/3 |
| 2008/0300698 A1* | 12/2008 | Havekost et al. | 700/83 |
| 2009/0006358 A1* | 1/2009 | Morris et al. | 707/5 |
| 2009/0100021 A1* | 4/2009 | Morris et al. | 707/3 |
| 2009/0138371 A1* | 5/2009 | McGee | 705/26 |
| 2009/0287683 A1* | 11/2009 | Bennett | 707/5 |
| 2010/0100836 A1* | 4/2010 | Corella et al. | 715/768 |
| 2010/0161661 A1* | 6/2010 | Hood et al. | 707/770 |
| 2011/0055203 A1* | 3/2011 | Gutt et al. | 707/722 |
| 2011/0246570 A1* | 10/2011 | Chiang | 709/203 |
| 2014/0317739 A1* | 10/2014 | Be'ery et al. | 726/23 |

OTHER PUBLICATIONS

Sim et al.; Browsing and Searching Software Architectures; published 1999; IEEE; 10 pages.*

Morris M. R. et al., S3: Storable, Shareable Search, in Human-Computer Interaction—INTERACT 2007, 11th IFIP TC 13 International Conference, Rio de Janeiro, Brazil, Sep. 10-14, 2007, Proceedings, Part I. Lecture Notes in Computer Science 4662 Springer 2007, ISBN 978-3-540-74794-9.

Morris D. et al., SearchBar: A Search-Centric Web History for Task Resumption and Information Re-finding, In Proceeding of the Twenty-Sixth Annual SIGCHI Conference on Human Factors in Computing Systems (Florence, Italy, Apr. 5-10, 2008). CHI '08. Association for Computing Machinery, New York, NY, 1207-1216. DOI= http://doi.acm.org/10.1145/1357054.1357242.

Morris M. R. et al., SearchTogether: An Interface for Collaborative Web Search, In Proceedings of the 20th Annual ACM Symposium on User interface Software and Technology (Newport, Rhode Island, USA, Oct. 7-10, 2007). UIST '07. Association for Computing Machinery, New York, NY, 3-12. DOI= http://doi.acm.org/10.1145/1294211.1294215.

* cited by examiner

┌─ 230
                          Queries
                                ┌─ 340
        Check All   Uncheck All   Delete
              └─ 350      └─ 360
312 ─  ☐ smoothie banana orange          1910000  ─ 314
                              └─ 310
       ☐ smoothie banana strawberry      3040000
                                   └─ 320
       ☐ smoothie banana guava            138000
                              └─ 330

Figure 3

╭─ 230
│          Queries
│              ╭─ 340
│  Check All   Uncheck All   Delete
│
│  ☑ banana                                185000000
│         ╰── 810
│  ☑ banana republic                        30600000
│              ╰── 820
│  ☑ banana bread recipe                    16700000
│                   ╰── 830
│  ☑ calories in a banana                    8930000
│              ╰── 840
│  ☐ smoothie banana orange                  1910000
│                   ╰── 310
│  ☐ smoothie banana strawberry              3040000
│                        ╰── 320
│  ☐ smoothie banana guava                    138000
│                   ╰── 330

Figure 8

FACILITATING BROWSING OF RESULT SETS

CROSS-REFERENCE TO RELATED APPLICATIONS

The subject matter of this application is related to the subject matter of U.S. Provisional Patent Applications No. 61/106,570, filed on Oct. 18, 2008, and No. 61/201,855, filed on Dec. 16, 2008, priority to which is claimed under 35 U.S.C. §119(e) and which are incorporated herein by reference.

The subject matter of this application is also related to the subject matter of a companion Non-Provisional Patent Application entitled "A Method of Computing a Cooperative Answer to a Zero-Result Query through a High-Latency API", by F. Corella and K. P. Lewison, filed simultaneously with this application.

BACKGROUND

Traditional search engines are not well suited to tackle difficult search problems. To solve a difficult search problem, a user may have to issue many queries and look at many pages in the result set of each query before finding a suitable result. But the user does not know how many pages he may have to look at in each result set. Therefore the user cannot inspect the result sets one at a time. After looking at, say, 3 pages in each result set, the user may have to go back and look at a further 3 pages in each of the same result sets. In other words, the user may have to interleave the browsing of the result sets or, so to speak, browse the result sets simultaneously. This is difficult to do in traditional search engine; to go back to an earlier result set, the user has to retype the query that produced the result set, or use the back button of the browser to backtrack through intervening pages of other result sets, documents visited by following links embedded in result sets, and, possibly, unrelated documents.

SUMMARY

One embodiment provides a method of facilitating the browsing of a plurality of result sets by a user. The method includes displaying a plurality of queries on a computer display, each query having a corresponding result set, the plurality of queries thereby constituting a set of displayed queries, and displaying the result set of a selected displayed query in response to the user selecting the query from the set of displayed queries via a user interface procedure, while continuing to display the set of displayed queries so the user can subsequently select other queries from the set of displayed queries to thereby interleave browsing the result sets of the queries in the set of displayed queries.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Reference numerals consist of a concatenation of a one- or two-digit number referring to a figure, followed by a two-digit number that locates the referenced part within the figure. A reference numeral pertaining introduced in a figure may be used in other figures to refer to the same part or a similar part.

FIG. 3 is an example of a set of queries displayed in a left panel according to one embodiment.

FIG. 8 is an example of a set of queries augmented with an incremental set of queries according to one embodiment.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

It is to be understood that the features of the various exemplary embodiments described herein may be combined with each other, unless specifically noted otherwise.

Figure 1:
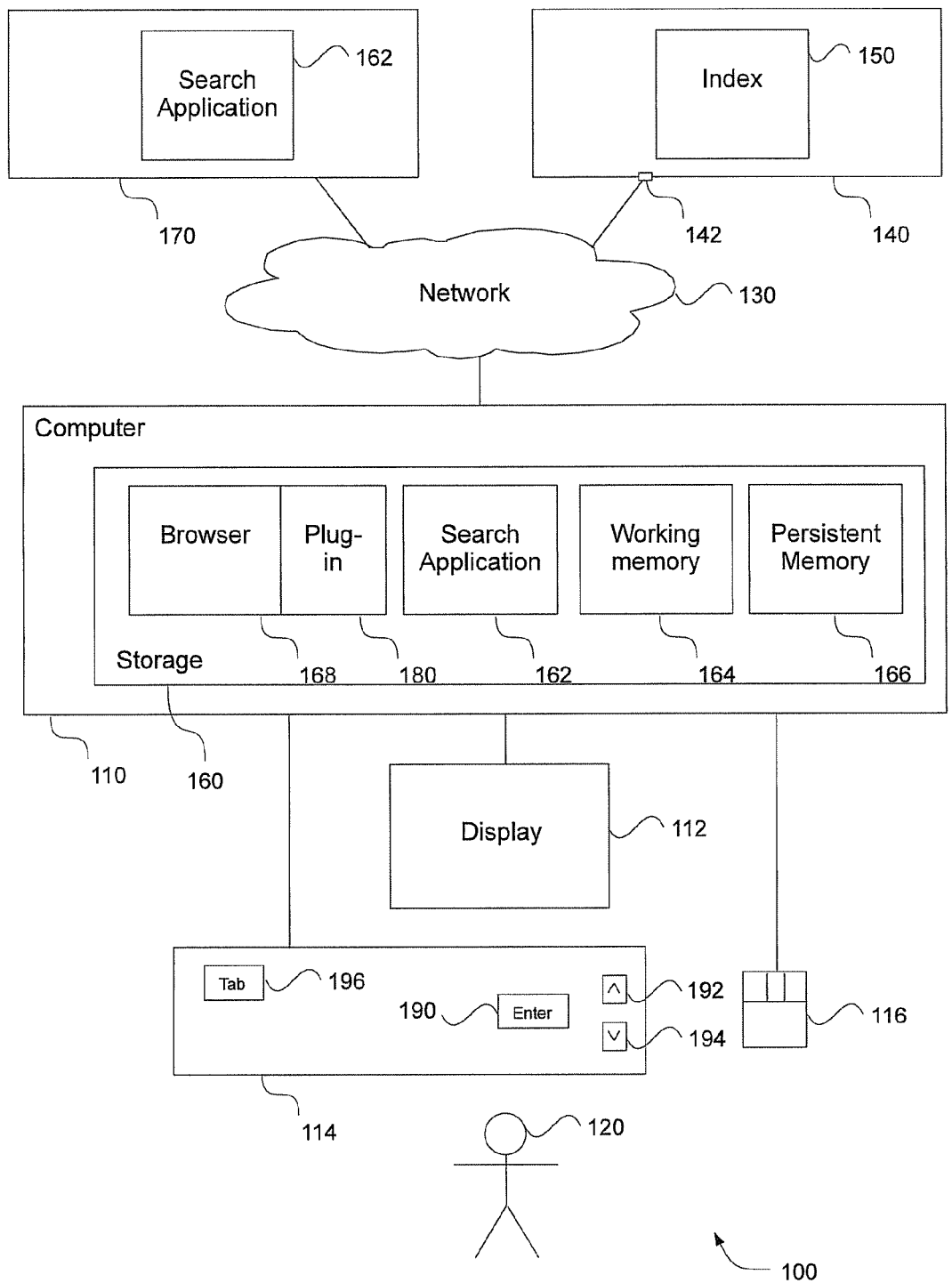
FIG. 1 is a block diagram generally illustrating an example of a system for facilitating the browsing of a plurality of result sets according to embodiments described herein.

FIG. 1 is a block diagram generally illustrating an example of a system 100 for facilitating the browsing of a plurality of result sets. The system comprises a computer 110 operated by a user 120, a network 130, and a search back-end 140 that hosts an index 150 into a collection of documents (the "indexed collection of documents"). Given a query, index 150 defines the result set of the query, each result in the result set being a data item providing information about a document that matches the query, including a link to the document. In one embodiment the collection of documents is the collection of files reachable on the World Wide Web. Search back-end 140 is connected to network 130 and exposes a network interface 142 that computer 110 uses to communicate with search back-end 140. Network interface 142 is a logical specification of messages that can be sent to and received from search back-end 140. For the purpose of illustration, network interface 142 is shown as a physical component in FIG. 1.

Computer 110 is equipped with a display 112, a keyboard 114 and a mouse 116 and includes a storage facility 160 that comprises physical components, such as physical memory and hard disks, and logical components, such as virtual memory, file systems, and caches. An executable program called a search application 162 is stored in the storage facility and runs on computer 110. Search application 162 has a fast working memory 164 that it uses to store data while it is running, and a slower persistent memory 166 that it uses to preserve data while it is not running, both being components of storage facility 160. The contents of working memory 164 are lost when search application 162 exits, but those of the persistent memory 166 are preserved and available when search application 162 is later restarted.

In one embodiment, network interface 142 exposed by the search back-end 140 uses Hypertext Transfer Protocol (HTTP) messages, such an interface being called an HTTP-based interface. In one such embodiment, network 130 is the Internet; the HTTP-based interface is then called a Web interface, or a Web Application Programming Interface (Web API).

In one embodiment, where network 130 is again the Internet, storage facility 160 contains a Web browser program 168 that runs on computer 110, and search application 162 is downloaded by the Web browser from a Web site 170 connected to the Internet.

In one embodiment, search application 162 runs on computer 110 by being interpreted by a browser extension 180, also known as a browser plug-in 180. In one embodiment the browser plug-in 180 is supplied by Adobe Systems Inc and called Flash Player, and search application 162 is built on a programming platform also supplied by Adobe Systems Inc and called Flex. In such an embodiment, working memory 164 is part of a virtual memory component of storage facility 160 and persistent memory 166 is a file controlled by Flash Player and contained in a file system component of storage facility 160. In such an embodiment, search application 162 comprises project code written in MXML and ActionScript and compiled by a platform compiler, and platform code supplied by Adobe Systems Inc, some of which is linked with the project code. The project code is an event-driven program, comprising routines that are invoked when events take place. Such a routine is called an "event listener" or "event handler", and is said to "handle" or "react to" the event upon which it is invoked.

Search application 162 uses display 112, keyboard 114, and mouse 116 of computer 110 to interact with user 120. Keyboard 114 is used to enter text into input fields of the display, and has a submission key 190, traditionally labeled "Enter" or "Return", used to submit data once the data has been entered into input fields. Keyboard 114 also has a key 192 labeled with an up-arrow and a key 194 labeled with a down-arrow (the "up/down keys") used for tasks such as moving a caret up and down or moving a highlighted selection up and down a menu or a list. At any given time, keyboard key-press events are directed to a particular user-interface element displayed on the display, which is said to "have keyboard focus". Keyboard 114 has a tab key 196, which the user can use to "bring keyboard focus" to a desired element. User 120 can also bring keyboard focus to an element by clicking on the element with mouse 116. Mouse 116 is used for performing user-interface procedures such as clicking on a button, or clicking a link displayed on the display 112, or dragging displayed data.

Search application 162 uses the network interface 142 to fetch data from the search back-end 140, data such as:

(1) an estimate of the number of results in the result set of a query, the estimate being accurate as to whether the result set is empty or not (i.e. the estimate being zero if the result set is empty, and not zero if the result set is not empty);

(2) a page of the result set of a query, pages being numbered, each page containing a fixed number of consecutive results (e.g. page 1 containing results 1 through 10, page 2 containing results 11 through 20, etc);

(3) a spelling suggestion (i.e. a suggested respelling of the query), available if the query may have been misspelled according to search back-end 140; and (4) a list of queries similar to the query (traditionally called "related queries" in search-engine jargon).

Figure 2:
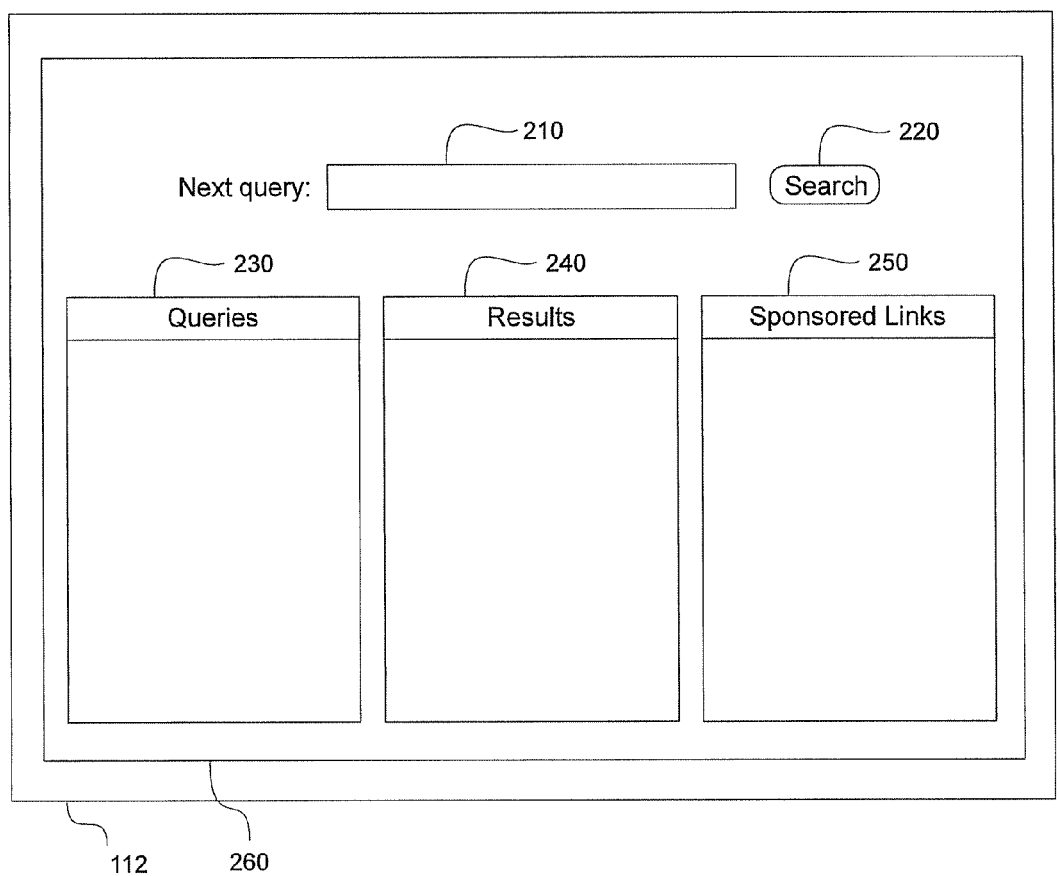
FIG. 2 is a block diagram illustrating user-interface elements displayed on a display according to one embodiment.

FIG. 2 illustrates display 112 being used by search application 162 to display user-interface elements to user 120, including: (1) an input field 210, called a "query box" or "search box", where user 120 can enter a query; (2) a search button 220 that user 120 can click to submit the query; and (3) three panels, a left panel 230, a center panel 240 and a right panel 250. In one embodiment, these user-interface elements are displayed inside a window 260 opened by Web browser 168 on display 112. In one embodiment, right panel 250 is used to display advertisements.

According to one embodiment, left panel 230 is used to display a set of queries. The terms "displayed query" and "left panel entry" (or simply "query" and "entry" when there is no ambiguity) will be used interchangeably to refer to an occurrence of a query in left panel 230. User 120 can select a displayed query by using a user-interface procedure on the query, such as clicking the query with mouse 116, such a user-interface procedure being called a selection procedure. Search application 162 itself can select a displayed query without user 120 using a selection procedure on the query. For example, in one embodiment, when user 120 submits a query, search application 162 creates an entry for the query at the top of left panel 230 and selects the entry. The query that was last selected by user 120 or by search application 162 is called the "selected query", the "selected entry", or the "selection". In one embodiment, the selected query is highlighted.

In one embodiment, search application 162 is built on the Flex platform and a user-interface element called a "list-based control", such as a "list control" or a "datagrid control", is used to display the set of queries in left panel 230, the control containing the queries This control will be called the left panel control. In such an embodiment, user 120 can select a displayed query by clicking on the query or by bringing keyboard focus to the left panel control and using keyboard up/down keys 192, 194 to move the selection, platform code detecting such user-interface procedures and changing the selection accordingly. The project code can read a property of the left panel control called "selectedIndex" to find out what displayed query is selected, and can assign a value to the property to change the selection.

Search application 162 reacts to user 112 selecting a displayed query by displaying the result set of the query in the center panel 240 in a manner that makes it available for browsing. Search application 162 also displays the result set in center panel 240 in such a manner when search application 162 itself selects the query. Thus, whenever a displayed query is selected, the result set of the query is displayed in center panel 240.

In one embodiment, search application 162 displays the result set, if it is not empty, by displaying a page of the result set and a result-set navigation tool, such as a page menu. While making the result set available for browsing in center panel 240, search application 162 continues to display the set of queries in left panel 230, so that user 120 can click on another query, such as a query that user 120 previously selected, to browse its result set. User 120 can thus interleave the browsing of the result sets of the queries in left panel 230.

FIG. 3 shows an example of a set of queries displayed in left panel 230 consisting of three queries: query 310, "smoothie banana orange"; query 320, "smoothie banana strawberry"; and query 330, "smoothie banana guava". User 120 may want to browse the result sets of these three queries in order to look for a good smoothie recipe.

An effective strategy for browsing the three result sets is a breadth-first strategy comprising the steps of viewing page 1 of the result set of query 310, then page 1 of the result set of query 320, then page 1 of the result set of query 330, then page 2 of the result set of query 310, then page 2 of the result set of query 320, then page 2 of the result set of query 330, and so on, thereby interleaving the browsing of the result sets or, so to speak, browsing the three result sets simultaneously. User 120 can perform each step with a single click. In contrast, if user 120 were using a traditional search engine, performing each step would require retyping a query or backtracking.

An entry in left panel 230 for a displayed query, such as entry 310, has an associated checkbox 312 and an associated estimate 314 of the number of results in the result set of the query. User 120 can click checkbox 312 using mouse 116 to toggle a state of checkbox 312, adding a checkmark if there is not one or removing the checkmark if there is one. User 120 can then click a user-interface element 340, such as a link or button labeled "Delete", to delete all displayed queries (i.e., all entries of queries) whose checkboxes 312 have a checkmark. User 120 can also click a user-interface element 350 labeled "Check All" to put checkmarks in all checkboxes 312, and a user-interface element 360 labeled "Uncheck All" to remove all the checkmarks.

Figure 4:
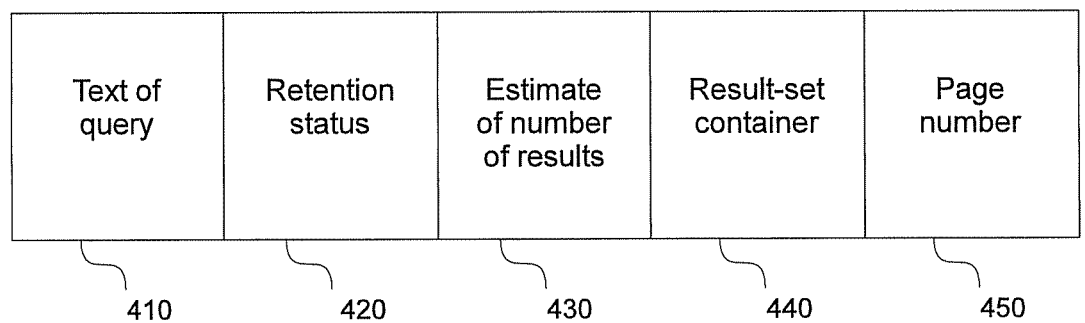
FIG. 4 is a block diagram illustrating data associated with a displayed query according to one embodiment.

FIG. 4 illustrates data associated with a displayed query (i.e. with a left panel 230 entry) and stored in working memory 164, according to one embodiment. As illustrated, the data comprises the following data items:

(1) the text of the query 410, stored as a string of characters;

(2) a retention status 420, which is a Boolean data item having a value "true" when the checkbox 312 associated with the displayed query does NOT have a checkmark, and a value "false" when the checkbox 312 has a checkmark;

(3) an estimate 430 of the number of results in the result set of the displayed query, if available; and (4) data items 440 and 450, which are further described below in connection with FIG. 10.

In one embodiment, where search application 162 is built on the Flex platform and the set of queries is displayed using a list-based Flex control called left panel control, said control is associated with a Flex object of a class "ArrayCollection", which comprises a collection of Flex objects, usually called "items of the ArrayCollection", but called herein "elements of the ArrayCollection" to avoid confusion with "data items". Each ArrayCollection element corresponds to a displayed query. In such embodiment, the data items associated with a displayed query are properties of the corresponding element, or properties of other Flex objects reachable by reference from the corresponding element. In particular, the data items 410, 420, and 430 are properties of the corresponding element, and platform code displays the left panel entry for the query according to the values of those data items. For example, the entry 310 shown in FIG. 3 for the query "smoothie banana orange" is displayed by platform code according to the text of the query 410 being equal to the string "smoothie banana orange", the retention status 420 being equal to true (causing the checkbox 312 to NOT have a checkmark), and the estimate 430 of the number of results in the result set being equal to 1910000.

Figure 5:
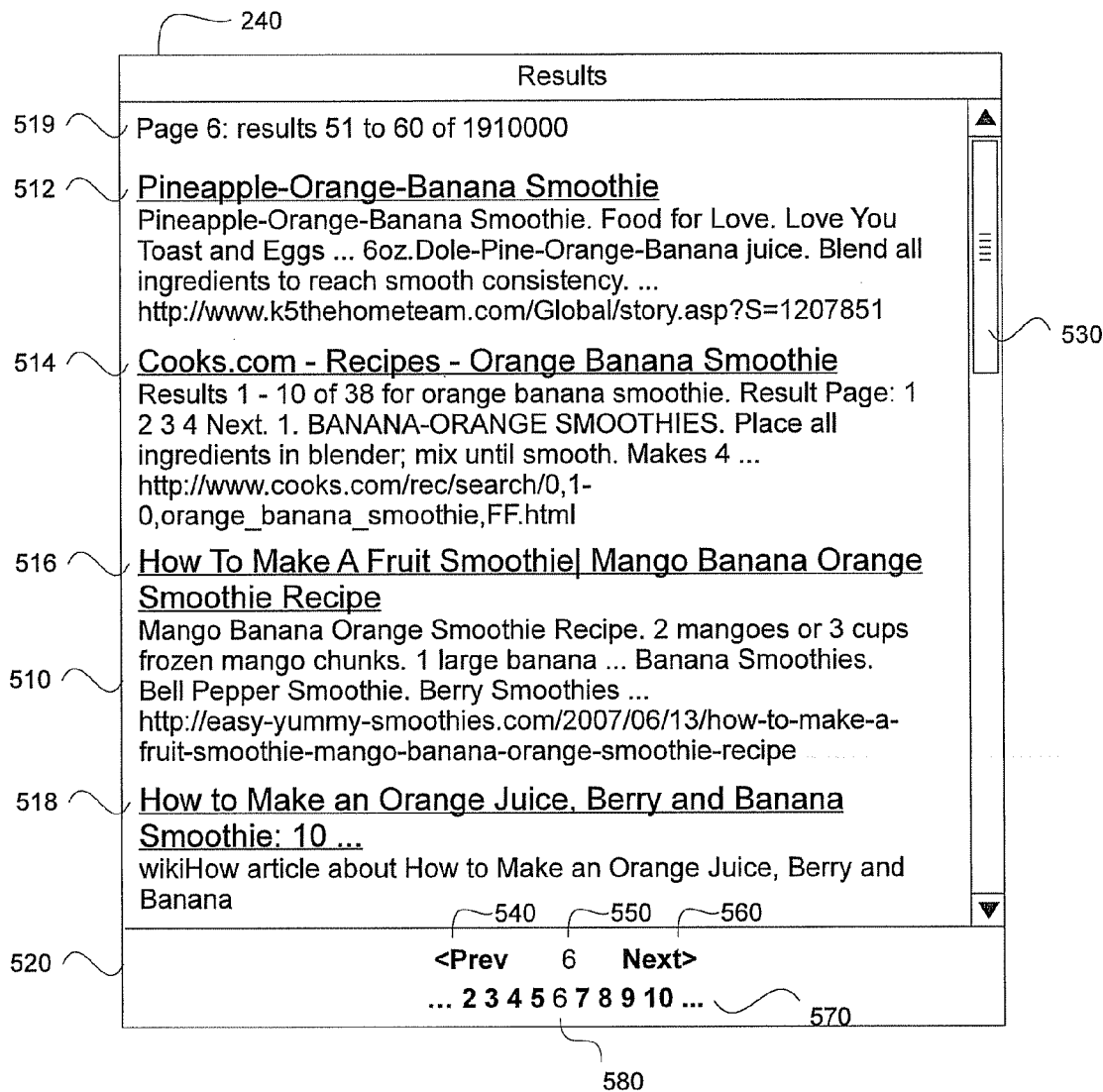
FIG. 5 is an example of a result set of a selected query being displayed in a center panel according to one embodiment.

FIG. 5 shows an example of center panel 240 displaying a result set of a displayed query that has been selected in left panel 230, making the result set available for browsing, according to one embodiment. The displayed query 310 "smoothie banana orange" of FIG. 3 is used in the example.

An area 510 of center panel 240 displays a page of the result set of the query, page 6 in the example. The page contains results 512, 514 and 516, as well as a result 518 that is partially visible and other results that are not visible, but can be made visible by the user using a scroll bar 530. At the top of the area 510, a header 519 provides the page number (page 6 in the example), the range of consecutive results contained in the page (results 51 to 60 in the example), and an estimate of the number of results in the result set (1910000 in the example).

An area 520 displays a navigation tool relative to the page displayed in area 510, the navigation tool allowing the user to "go to" or "navigate to" or "visit" a destination page. Visiting a page means displaying the page in area 510 and a navigation tool now relative to the destination page in the area 520. In the embodiment illustrated in FIG. 5, the navigation tool is a page menu relative to the page displayed in area 510. The page menu comprises a button 540 labeled "<Prev", a label 550 that shows the number of the page displayed in the area 510 ("6" in the example), a button 560 labeled "Next>", and a row 570 of buttons labeled by page numbers, including a button 580 labeled with the page number of the page displayed in the area 510 ("6" in the example), up to four buttons labeled with numbers immediately preceding such page number, and up to four buttons labeled with page numbers immediately following such page number. User 120 can click on a button to go to a corresponding destination page. For example, user 120 can click on the button 560 labeled "Next>" to go to the page that immediately follows the page displayed in the area 510 (i.e. to page 7 in the example). The button 580 corresponding the page displayed in the area 510 is disabled. The buttons labeled "<Prev" and "Next>" are disabled if no corresponding pages are available. The row 570 of numbered buttons only contains buttons whose corresponding pages are available. User 120 can use the page menu in the area 520 to browse the result set of the selected query by visiting pages of the result set.

In one embodiment, user 120 can submit a query by entering the query in query box 210, and then clicking search button 220 or pressing submission key 190. User 120 can also submit a query that is already displayed in left panel 230 by dragging the query to query box 210 or double-clicking on the query. When user 120 submits a query, search application 162 displays the result set of the query in center panel 240. Furthermore, search application 162 adds the query to left panel 230, creating an entry for the query at the top of the panel and selecting the entry. This results in two entries for the query when user 120 submits by double-clicking, but not when user 120 submits by dragging, because dragging has the side-effect of removing the dragged query.

In one embodiment, when user 120 submits a query, search application 162 augments the set of queries displayed in left panel 230 with an incremental set of displayed queries that comprises the submitted query, but may also comprise additional queries.

Search application 162 asks search back-end 140 for a possible respelling of the submitted query. If search back-end 140 deems that the submitted query is misspelled, it responds with a respelled query (i.e. a query derived from the submitted query by correcting the presumed misspelling). Search application 162 then includes the respelled query in the incremental set of displayed queries.

In one embodiment, search application 162 also requests, besides a respelling of the submitted query, queries similar to the submitted query that search back-end 140 deems could be suggested to user 120 as possible follow-up queries. (Such queries are traditionally called "related queries" in search engine jargon, but the word "similar" will be used here instead of "related", to distinguish such queries from a respelling of the submitted query or subqueries of the submitted query, which are also related to the submitted query.) If search back-end 140 responds with any similar queries, search application 162 includes the similar queries in the incremental set of displayed queries.

In one embodiment, if search back-end 140 suggests no similar queries and the query consists of more than a single search term, search application 162 includes a collection of subqueries of the submitted query in the incremental set of queries, a subquery being derived from the submitted query by removing syntactic elements. If the submitted query is a conjunctive query, search application 162 includes the immediate conjunctive subqueries of the submitted query, a conjunctive subquery being obtained by removing one or more conjuncts, and an immediate conjunctive subquery being obtained by removing exactly one conjunct.

Figure 6:
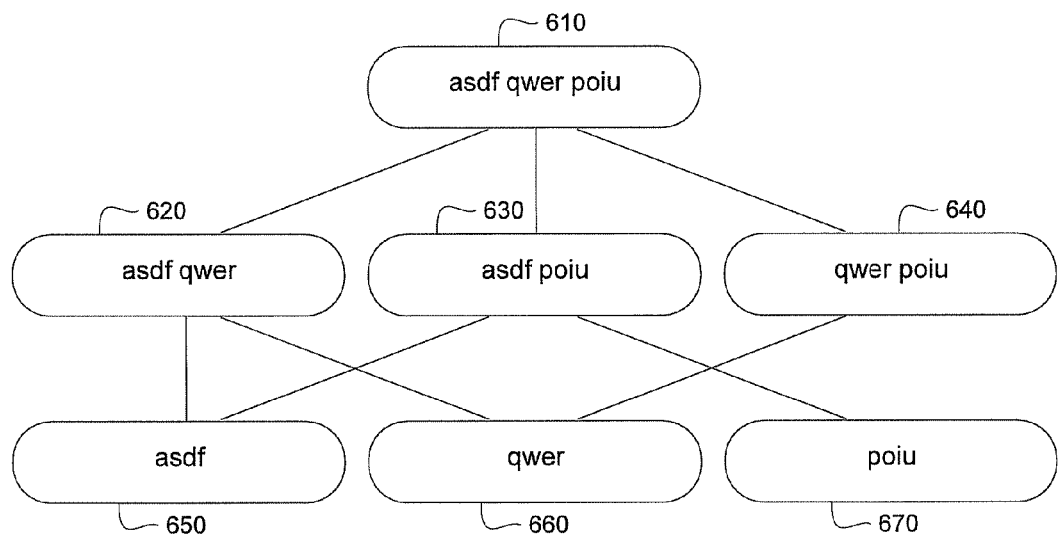
FIG. 6 is an illustration of the concept of a conjunctive query and its subqueries.

FIG. 6 is a graph illustrating the concept of a conjunctive query and its subqueries. The nodes of the graph are queries. Node 610 is the query "asdf qwer poiu", which is a conjunctive query with implicit conjunction operators, logically equivalent to the query "asdf AND qwer AND poiu" where the conjunction operators are explicit. Nodes 620, 630, and 640 are the immediate conjunctive subqueries of the query, obtained by removing one conjunct, and nodes 650, 660, and 670 are non-immediate conjunctive subqueries, derived by removing two conjuncts.

In one embodiment, search application 162 recognizes an explicit OR operator and, thus, the submitted query can be a disjunctive query. In such embodiment, if search back-end 140 suggests no similar query when the submitted query is a disjunctive query, search application 162 includes the immediate disjunctive subqueries of the submitted query in the incremental set of queries, a disjunctive subquery being obtained by removing one or more disjuncts, and an immediate disjunctive subquery being obtained by removing exactly one disjunct.

Figure 7:
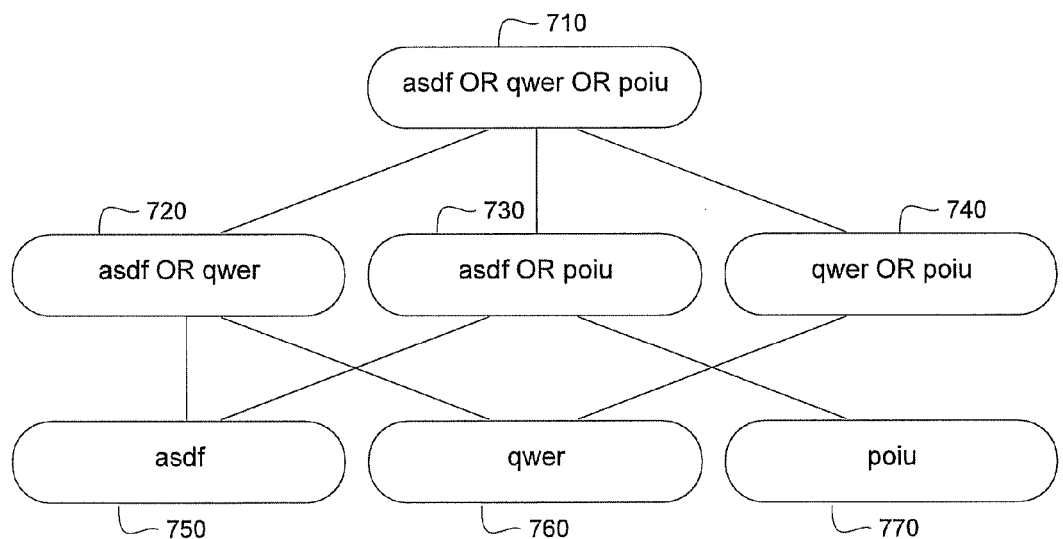
FIG. 7 is an illustration of the concept of a disjunctive query and its subqueries.

FIG. 7 is a graph illustrating the concept of a disjunctive query and its subqueries. Node 710 is the disjunctive query "asdf OR qwer OR poiu. Nodes 720, 730, and 740 are the immediate disjunctive subqueries of the query, obtained by removing one disjunct, and nodes 750, 760, and 770 are non-immediate disjunctive subqueries, derived by removing two disjuncts.

In one embodiment, when user 120 submits a query and search back-end 140 indicates that the query has an empty result set (e.g. by providing an estimate of the number of results equal to zero), search application 162 adds to left panel 230 a collection of queries that together constitute a cooperative response to the submitted query. In one embodiment, search application 162 uses a method described in the companion patent application cross-referenced above. In one embodiment, search application 162 uses one of the methods described in the computer science literature to compute the collection of queries, such as the method described in the paper: F. Corella, S. J. Kaplan, G. Wiederhold and L. Yesil, Cooperative Responses to Boolean Queries. In Proceedings of the First International Conference on Data Engineering, pages 77-85. IEEE Computer Society, 1984.

FIG. 8 shows an example of the set of queries in the left panel 230 being augmented with an incremental set of queries, according to one embodiment, when user 120 submits a new query "banana", left panel 230 being as shown in FIG. 3 before user 120 submits the query. The incremental set of queries comprises the submitted query itself 810, "banana", and three queries similar to the submitted query, a query 820 "banana republic", a query 830 "banana bread recipe", and a query 840 "calories in a banana". The augmented set of queries comprises the incremental set and the queries 310, 320 and 330 that were present in left panel 230 before user 120 submitted the query.

The queries in the incremental set of queries are added to left panel 230 with checkboxes 312 that already have checkmarks, as shown in FIG. 8. This makes it easy for user 120 to delete all the added queries by clicking on the Delete link 340. Furthermore, when user 120 enters a query, all the queries having checkmarks are automatically deleted. Thus, if user 120 ignores left panel 230 as he/she submits queries, queries do not accumulate in left panel 230. If user 120 wants to keep one of the queries in the incremental set, he/she can remove the checkmark before submitting a subsequent query.

An economy of means is thus achieved by using checkboxes 312 associated with the displayed queries for a dual purpose: deleting queries at any time (by checking their checkboxes 312 and clicking on Delete link 340), and retaining queries after they have been added to left panel 230 (when a query is submitted) but before they are automatically deleted (when a subsequent query is submitted).

Figure 9:
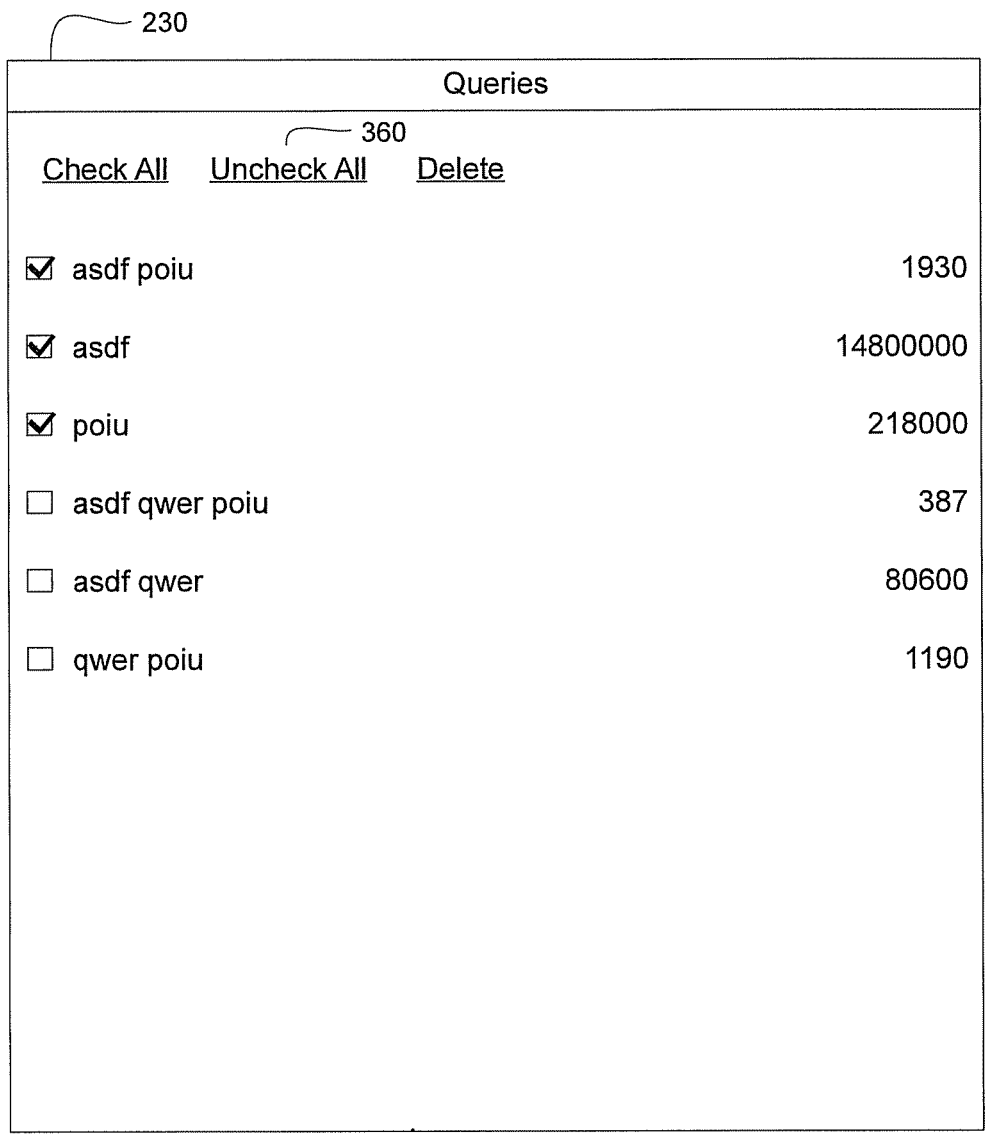
FIG. 9 is an example of conjunctive subqueries added to a left panel according to one embodiment.

FIG. 9 shows how the ability to retain displayed queries in left panel 230 provides user 120 with a means of adding to left panel 230 conjunctive subqueries of a conjunctive query (respectively, disjunctive subqueries of a disjunctive query) having any number of conjuncts (respectively, disjuncts) without typing any queries. For example, consider the conjunctive query "asdf qwer poiu". Assuming that neither the query nor any of its immediate conjunctive subqueries have similar queries according to back-end 140, user 120 can accumulate in left panel 230 the set of displayed queries shown in FIG. 9 by taking the following steps:

(1) Submitting the query "asdf qwer poiu", thus adding the query and its immediate conjunctive subqueries "asdf qwer", "asdf poiu" and "qwer poiu" to left panel 230, each with a checkmark in its checkbox 312.

(2) Clicking on the Uncheck All link 360 to remove the checkmarks.

(3) Dragging the immediate conjunctive subquery "asdf poiu" displayed in left panel 230 to the query box. This has the side-effect of removing the entry for the subquery from left panel 230, but then search application 162 adds an entry for the subquery at the top of the panel, followed by entries for its own immediate conjunctive subqueries "asdf" and "poiu", each with a checkmark in its checkbox 312.

User 120 can then browse the result sets of all the displayed queries simultaneously.

Figure 10:
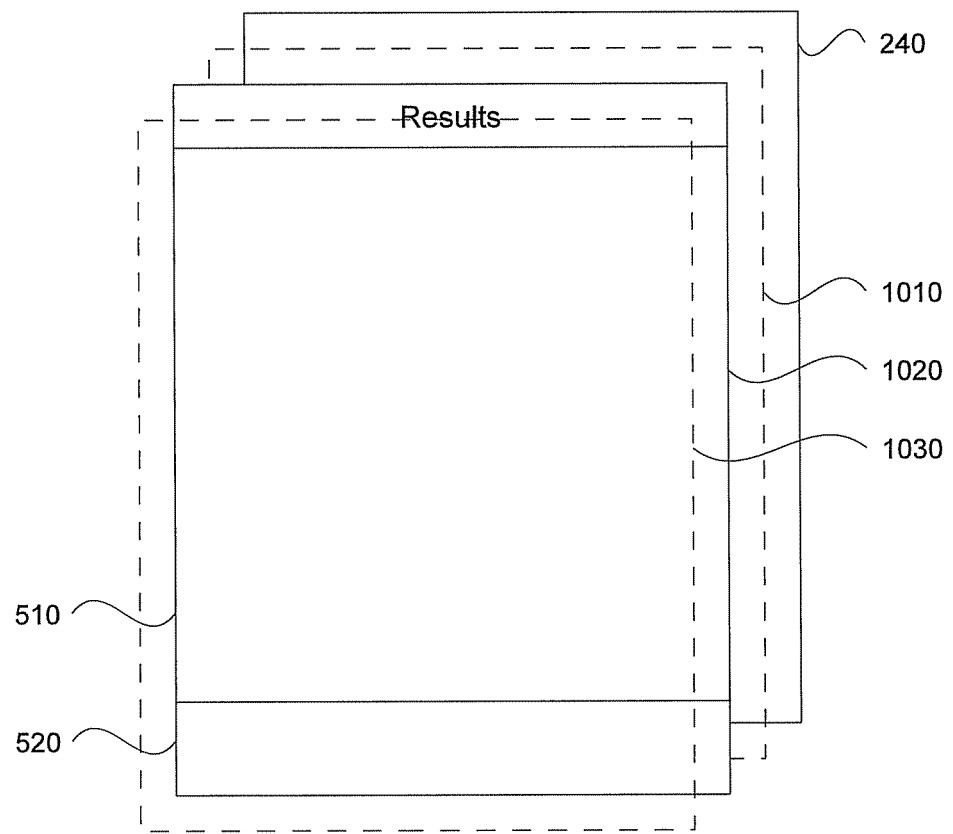
FIG. 10 is a block diagram illustrating result-set containers nested in a center panel container and superimposed on each other, only one of which is visible, according to one embodiment.

FIG. 10 illustrates a method of displaying a result set that appears instantaneous to user 120, according to one embodiment, where search application 162 is built on the Flex platform. The center panel 240 is implemented as a Flex container (the "center panel container") that contains nested Flex containers 1010, 1020, 1030, all having the same size and position as center panel 204 and, thus, being superimposed on each other, but at most one being visible at a time. In the illustration of FIG. 10, container 1020 is visible whereas containers 1010 and 1030 are not visible. Each nested container is associated with a query displayed in left panel 230 and displays the result set of the query, making it available for browsing. A nested container is hereinafter referred to as a result-set container. When user 120 selects the query, search application 162 makes the container visible by assigning the Boolean value true to a property of the container called "visible" and, if another nested container is visible, search application 162 makes it invisible by assigning the Boolean value false to its "visible" property.

Returning to the description of FIG. 4, which illustrates data associated with a displayed query, data item 440 is a result-set container associated with the displayed query. If the result set of the displayed query is not empty, result-set container 440 contains a page of the result set in area 510, and a navigation tool such as a page menu, relative to the page, in the area 520 (see FIG. 5, where it is noted that areas 510 and 520 were described as pertaining to center panel 240, but each result-set container has its own areas 510 and 520, those of the result-set container that is visible at any particular time appearing in the center panel at that time.). The page may not entirely fit in the area 510 and, while the result-set container is visible, user 120 may scroll the page using the scroll bar 530. The Flex platform code performs the scrolling by modifying data structures pertaining to the result-set container. When the result-set container becomes invisible, its contents are preserved unchanged. When the result-set container becomes visible again, therefore, it displays the last visited page of results in the area 510 at the last scrolling position, and the same navigation tool relative to the page of results in the area 520.

FIG. 4 also shows a page number data item 450 associated with a displayed query. Page number data item 450 is used to track the page number of the page of the result set of the displayed query that is laid out in area 510 of the result-set container 440 if the result set is not empty. When the result-set container data item 440 exists, the page number data item 450 is not used when user 120 selects the displayed query, since the result set is displayed simply by making the result set container visible. The purpose of page number data item 450 is to help preserve the page number when search application 162 exits. The value of the data item is copied to persistent memory 166 when search application 162 exits, and is recovered from persistent memory 166 when search application 162 restarts, as described in connection with FIG. 11.

Fetching a page of results from search back-end 140 takes a few hundredths of a second; laying out a page of results and a page menu takes 20 or 30 milliseconds, an amount of time that, although short, is perceptible by user 120. However, making a nested container visible usually takes less than 1 millisecond and appears instantaneous to user 120. The use of result-set containers provides a means of saving and reusing a page of results, saving the time it would take to fetch the page again from search back-end 140; and a means of saving and reusing the layout of the page and page menu, saving the time it takes to do the layout again, and making the switch from one result set to another, as user 120 is browsing several result sets simultaneously, appear instantaneous.

In one embodiment, data comprising data items 410, 420, 430, and 450 associated with every displayed query is saved from working memory 164 to persistent memory 166 when search application 162 exits, and read back from persistent memory 166 to working memory 164 when search application 162 restarts. If the displayed query has ever been selected, the page number data item 450 is the page number of the last visited page of the result set of the displayed query, as will become apparent from the description of FIGS. 22 and 23 below. Thus the last visited pages of the displayed queries are preserved while search application 162 is not running.

Result-set container data item 440 is not among the data items that are saved. However, after search application 162 is restarted, the result-set container is recreated using the page number 450, as described in connection at 2270 of the process illustrated in FIG. 22.

In one embodiment, search application 162 is built on the Flex platform and persistent memory 166 is implemented as a local file controlled by Flash Player. Such an embodiment is advantageous in that it provides a large amount of persistent storage to search application 162 even though search application 162 runs in the context of a Web browser and does not have unrestricted access to a file system. However, a particular difficulty arises in such embodiment because the project code is not notified when search application 162 is about to exit and is not able to save data at application-exit time. The project code must instead copy the data to a so-called "local shared object", from which the platform code copies the data to persistent memory 166 at application-exit item.

Figure 11:
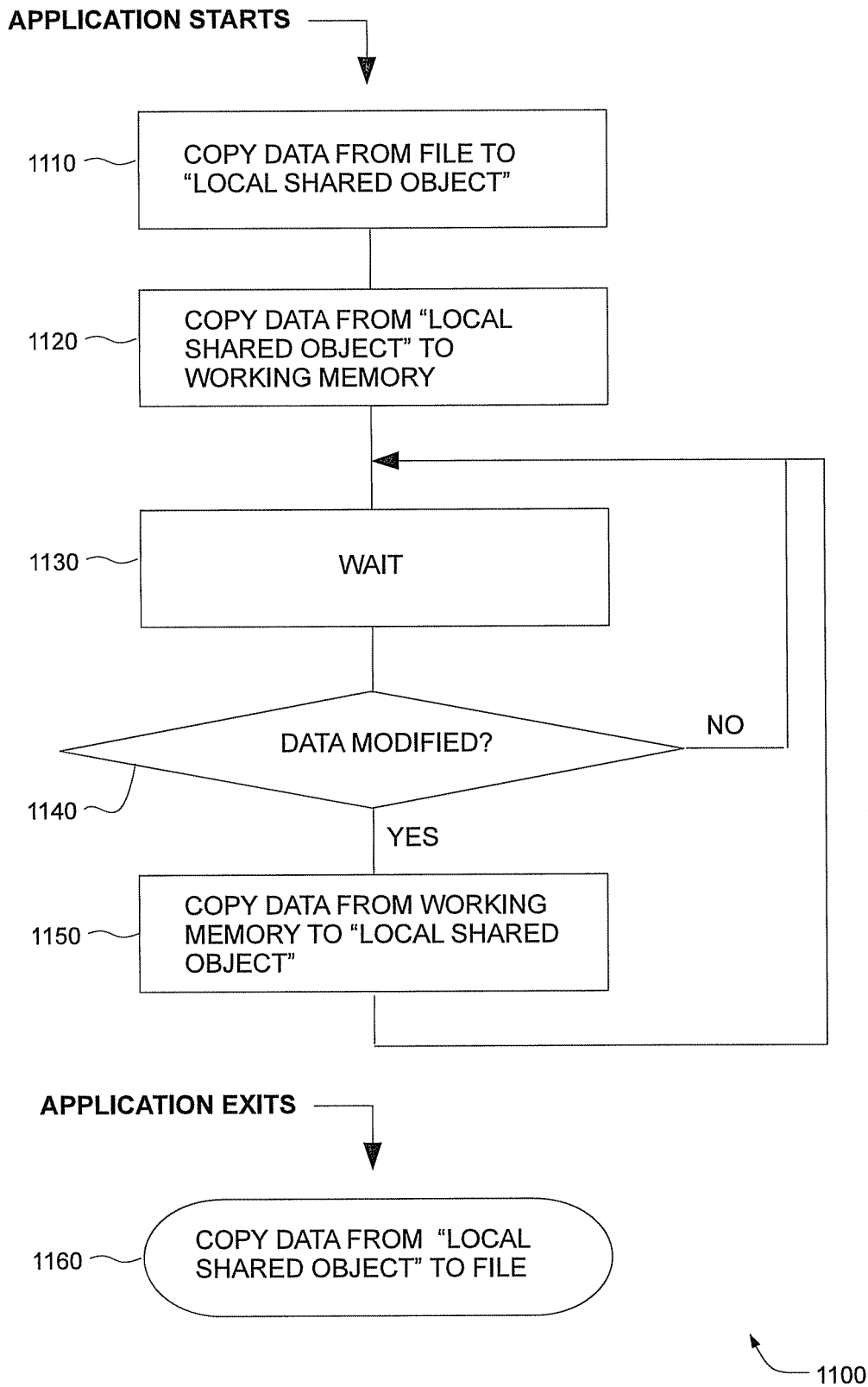
FIG. 11 is a flow diagram illustrating a process employed by a search application to save and read back data according to one embodiment.

FIG. 11 is a flow diagram generally illustrating one embodiment of a process 1100 employed by search application 162 to save and read back the data. For expository reasons the local shared object is not deemed to be part of the working memory 164, even though it is implemented in virtual memory.

When search application 162 starts, the platform code, at 1110, copies the data, if available, from persistent memory 166 implemented as a file controlled by Flash Player to a "local shared object". Recall that the data consists of the data items 410, 420, 430, and 450 associated with every left panel 230 (i.e. displayed query) entry when search application 162 exited. The data is available if search application 162 ran previously on computer 110, and there were left panel 230 entries when search application 162 exited, and the file that implements persistent memory 166 has not been deleted.

At 1120, also upon the start of search application 162, the project code copies the data, if available, from the local shared object to the working memory, creating a left panel entry for each set of data items 410, 420, 430 and 450 found in the local shared object and associating the data items with the entry. It is noted that, at 1120, the copying of the data is performed by project code rather than platform code, and only after 1110. Recreation of the data item 440 occurs later as described below in connection with step 2270 of FIG. 22. In one embodiment, if no data is available, search application 162 assumes that it is running for the first time on computer 100 and displays a large logo, omitting the panels 230, 240, and 250. The large logo is removed from display 112 and the panels are added when user 120 submits a first query.

After 1120, the project code enters a loop that begins at 1130 and has no termination condition, ending only when search application 162 terminates. The purpose of the loop is to ensure that the local shared object contains a recent copy of the data when search application 162 terminates.

At 1130, the project code waits for a small, fixed amount of time, such as one second or half a second, by means of a Flex timer, and then proceeds to 1140. At 1140, the project code checks if the data has been modified in the working memory 164 since the last prior execution of step 1140. If so, the project code proceeds to 1150. Otherwise the project code loops back to 1130. At 1150, the project code copies the data from the working memory 164 to the local shared object and loops back to 1130.

When search application 162 exits, platform code performs step 1160, copying the data from the local shared object to persistent memory 166 implemented as a file controlled by Flash Player.

Figure 12:
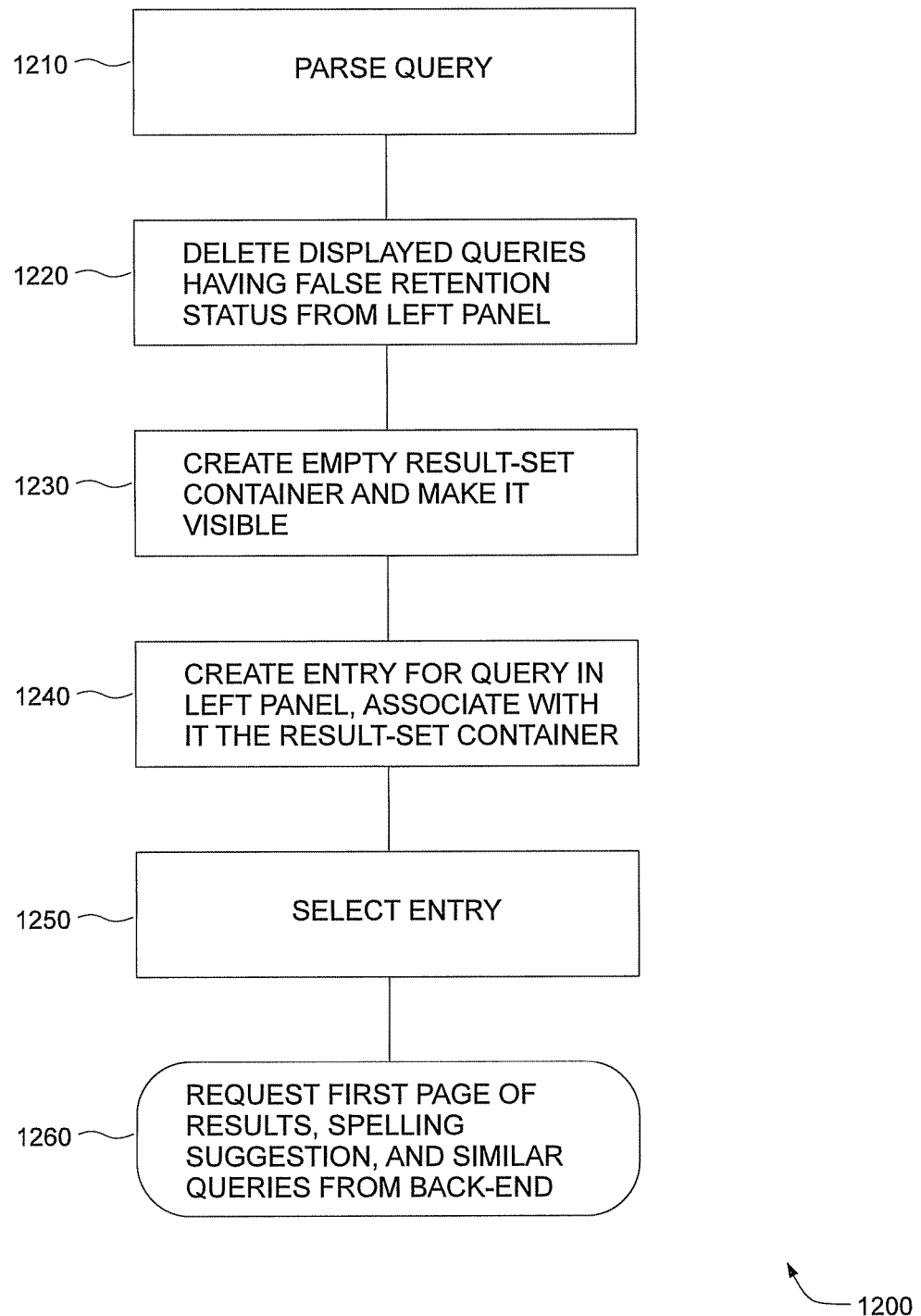
FIG. 12 is a flow diagram illustrating a process employed by a search application to handle a submission of a query by a user according to one embodiment.

FIG. 12 is a flow diagram generally illustrating one embodiment of a process 1200 employed by search application 162 to handle a submission of a query by user 120.

At 1210, search application 162 parses the query found in the query box 210. In one embodiment, parsing the query consists of splitting the text of the query into words and quoted phrases separated by spaces without recognizing any explicit Boolean operators, each word and each quoted phrase being a search term. In such an embodiment, the query may consist of a single search term, or may be an implicit conjunction of the search terms.

In another embodiment, while parsing the query, search application 162 recognizes explicit Boolean operators such as a disjunction operator OR, an explicit conjunction operator AND, and an explicit conjunction operator NOT, besides the implicit conjunction operator, and also recognizes syntactic constructs for grouping such as parentheses. In such embodiment the query may consist of a single search term, or may be a conjunction, a disjunction, or a negation. The parsing of the query determines the conjuncts of the query if the query is a conjunction, and the disjuncts of the query if the query is a disjunction. After parsing the query, search application 162 proceeds to 1220.

At 1220, search application 162 deletes from left panel 230 the displayed queries that have an associated retention status data item 420 equal to "false", and proceeds to 1230. At 1230, search application 162 creates a result-set container nested in center-panel container 240, checks if there is another result-set container nested in center panel 240 that is currently visible and, if so, makes the other result-set container invisible. Search application 162 then makes the newly created result-set container visible and proceeds to 1240.

At 1240, search application 162 creates an entry for the query at the top of left panel 230, with an associated retention status data item 420 equal to "false", an associated result-set container data item 440 equal to the result-set container created at 1230, and an associated page number data item 450 equal to "1". Search application 162 then proceeds to 1250. At 1250, search application 162 selects the entry created at 1240 and proceeds to 1260.

At 1260, search application 162 uses network interface 142 to convey the query submitted by user 120 to search back-end 140 and requests the first page of the result set of the query, a spelling suggestion, and a suggestion of similar queries. In one embodiment, where search back-end 140 is provided by Microsoft Corporation, a single message conveys all three requests. In one embodiment, where search back-end 140 is provided by Yahoo Inc., three separate messages must be sent to the back-end, a first message requesting the first page of results, a second message requesting the spelling suggestion, and a third message requesting the suggestion of similar queries. The response to the first message provides an estimate of the number of results in the result set of the query, and the first page of the result set if the result set is not empty. The response to the second message provides a set of respelled queries with at most one element. The response to the third message provides a possibly empty set of queries that are similar to the submitted query.

Figure 13:
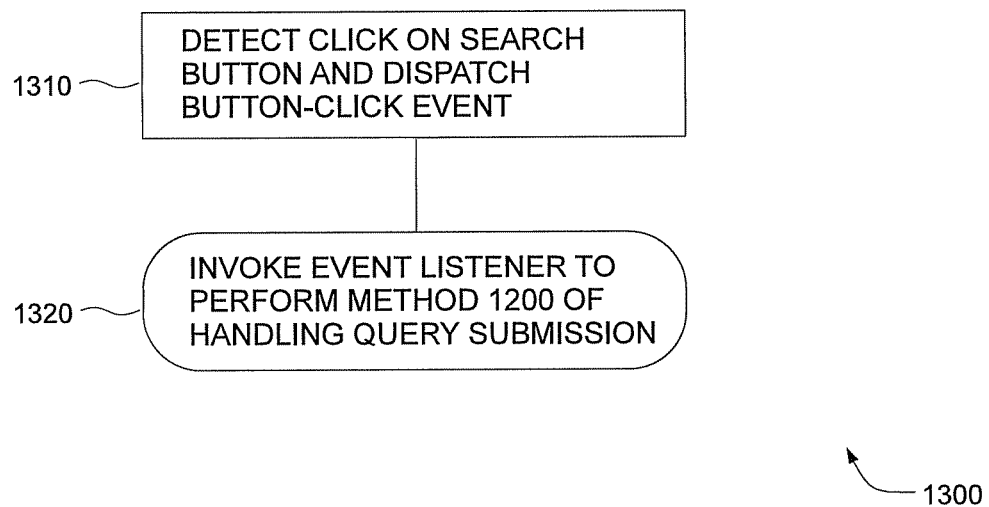
FIG. 13 is a flow diagram illustrating a process employed by a search application when a user submits a query by entering the query in a query box and clicking on a search button, according to one embodiment.
Figure 14:
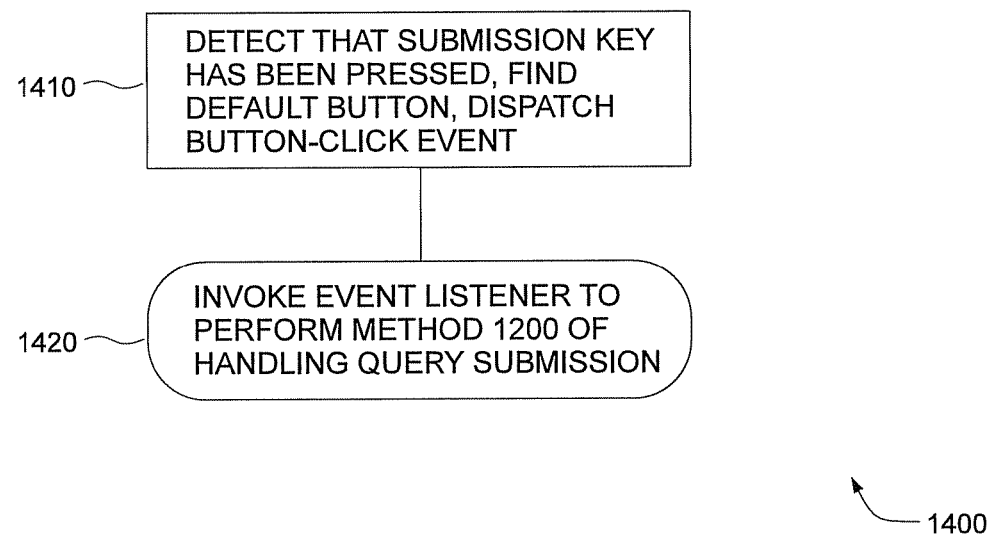
FIG. 14 is a flow diagram illustrating a process employed by a search application when a user submits a query by entering the query in a query box and pressing a submission key, according to one embodiment.
Figure 15:
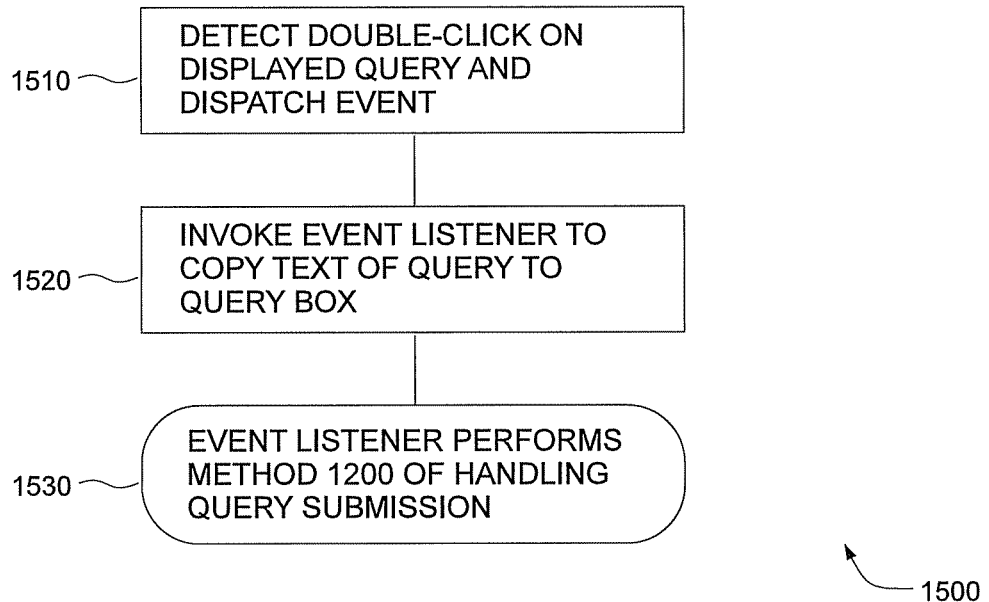
FIG. 15 is a flow diagram illustrating a process employed by a search application when a user submits a displayed query by double-clicking the query, according to one embodiment.
Figure 16:
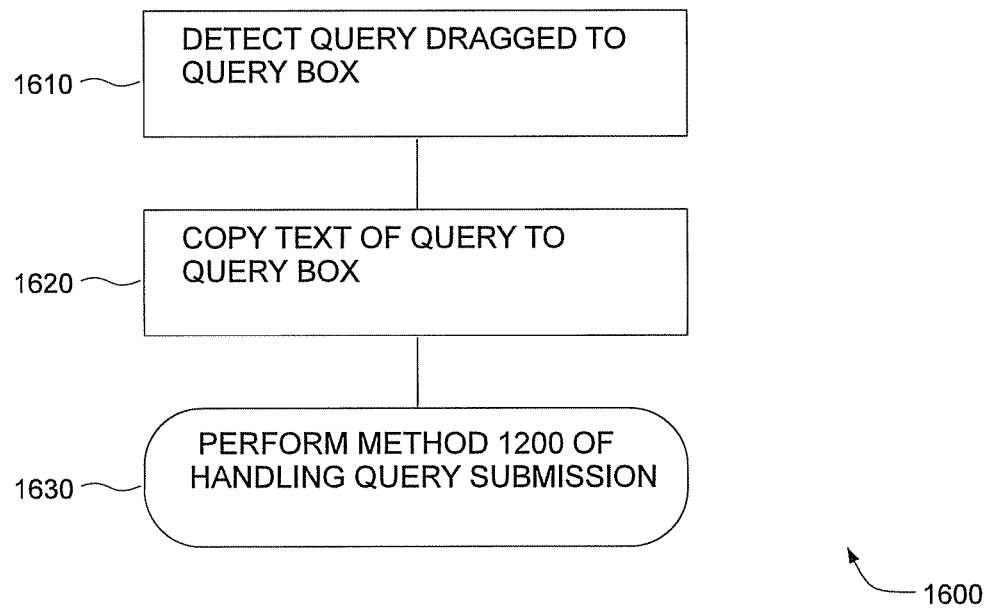
FIG. 16 is a flow diagram illustrating a process employed by a search application when a user submits a displayed query by dragging the query to a query box, according to one embodiment.

FIGS. 13, 14, 15, and 16 are flow diagrams which generally illustrate user-interface procedures for submitting a query in an embodiment where search application 162 is built on the Flex platform and a list-based control called the left panel control is used to display the set of queries in left panel 230. In FIG. 13, the user-interface procedure consists of entering the query in the query box 210 and clicking the search button 220. In FIG. 14 the procedure consists of entering the query in query box 210 but then pressing submission key 190 instead of clicking button 220, button 220 being configured as default button so that the two actions have the same effect. FIGS. 15 and 16 show user-interface procedures for submitting a query that is already displayed in the left panel control, viz. double-clicking on the query, and dragging the query to query box 210. Submitting an already displayed query is useful as a way of displaying again queries similar to the displayed query, or a respelling of the displayed query, or subqueries of the displayed query.

FIG. 13 is a flow diagram generally illustrating one embodiment of a process 1300 employed by search application 162 when user 120 submits a query by entering the query in query box 210 and clicking on search button 220. At 1310, search application 162 detects the click on button 220 and dispatches a button-click event, which is performed by platform code rather than project code. Search application 162 then proceeds to 1320. At 1320, search application 162 uses a button-click event listener invoked by the button-click event dispatched at 1310 to perform the method 1200 of handling a query submission, as shown in FIG. 12.

FIG. 14 is a flow diagram generally illustrating one embodiment of a process 1400 employed by search application 162 when user 120 submits a query by entering the query in query box 210 and pressing submission key 190. At 1410, search application 162 detects that submission key 190 has been pressed, notices that the search button 220 is the default button, and dispatches a button-click event as if the search button had been clicked, which is performed by platform code rather than project code.

Search application 162 then uses the same button-click event listener used at 1320 of FIG. 13 to perform the method 1200 of handling a query submission, as shown in FIG. 12.

FIG. 15 is a flow diagram generally illustrating one embodiment of a process 1500 employed by the search application 162 when user 120 submits a displayed query by double-clicking on the query. At 1510, search application 162 detects that the displayed key has been double-clicked and dispatches a button-double-click event, which is performed by platform code rather than project code. Search application 162 then proceeds to 1520.

At 1520, search application 162 invokes an event listener for the button-double-click event dispatched at step 1510, which copies the text-of-the-query data item 410 associated with the displayed query to query box 210. Search application 162 then proceeds to 1530, where the event listener invoked at step 1520 performs the method 1200 of handling a query submission, as shown in FIG. 12.

FIG. 16 is a flow diagram generally illustrating one embodiment of a process 1600 followed by search application 162 when user 120 submits a displayed query by dragging the displayed query to query box 210. At 1610, search application 162 detects that the displayed query has been dragged to query box 210, and proceeds to 1620.

At 1620, search application 162 copies the text-of-the-query data item 410 associated with the displayed query to query box 210, and proceeds to 1630. At 1630, search application 162 performs the method 1200 of handling a query submission shown in FIG. 12.

Although not illustrated in FIG. 16, it is noted that process 1600 further includes removing the displayed query from query box 210, which is performed by platform code in parallel with handling the query submission at 1630.

Figure 17:
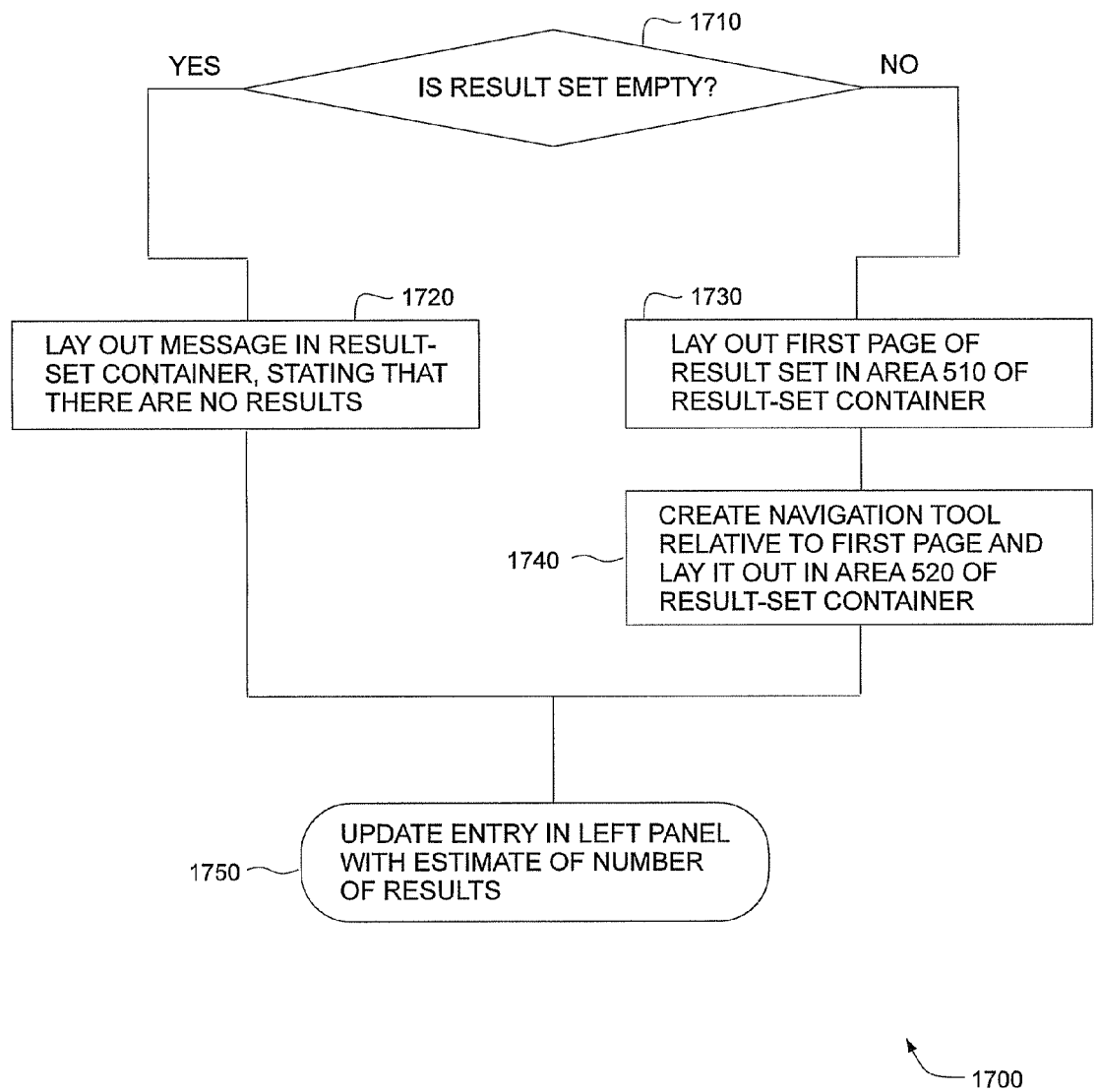
FIG. 17 is a flow diagram illustrating a process employed by a search application to handle a response from a back-end to a request for a first page of a result set of a submitted query, according to one embodiment.

FIG. 17 is a flow diagram generally illustrating one embodiment of a process 1700 employed by search application 162 when a response is received from search back-end 140 to a message sent at 1260 of process 1200, the process 1200 having been used to handle a submission of a query, the response from search back-end 140 providing an estimate of the number of results in the result set of the query and, if the estimate is not zero, the first page of the result set. Process 1200 created a result-set container, at 1230, and created an entry for the query in left panel 230, associating the result-set container with the entry at 1240.

At 1710, search application 162 checks if the result set is empty based on the estimate of the number of results. If the result set is empty, search application 162 proceeds to 1720. Otherwise, search application 162 proceeds to 1730. At 1720, search application 162 lays out a message in the result-set container, stating that the submitted query has no results and proceeds to 1750. At 1730, search application 162 lays out the first page of the result set in the area 510 of the result-set container, and proceeds to 1740

At 1740, search application 162 creates a navigation tool, such as a page menu for the result set, relative to the first page, and lays it out in area 520 of the result-set container. Search application 162 proceeds to 1750. At 1750, search application 162 updates the left panel entry by associating the estimate of the number of results obtained from search back-end 140 with the left panel entry as data item 430.

Figure 18:
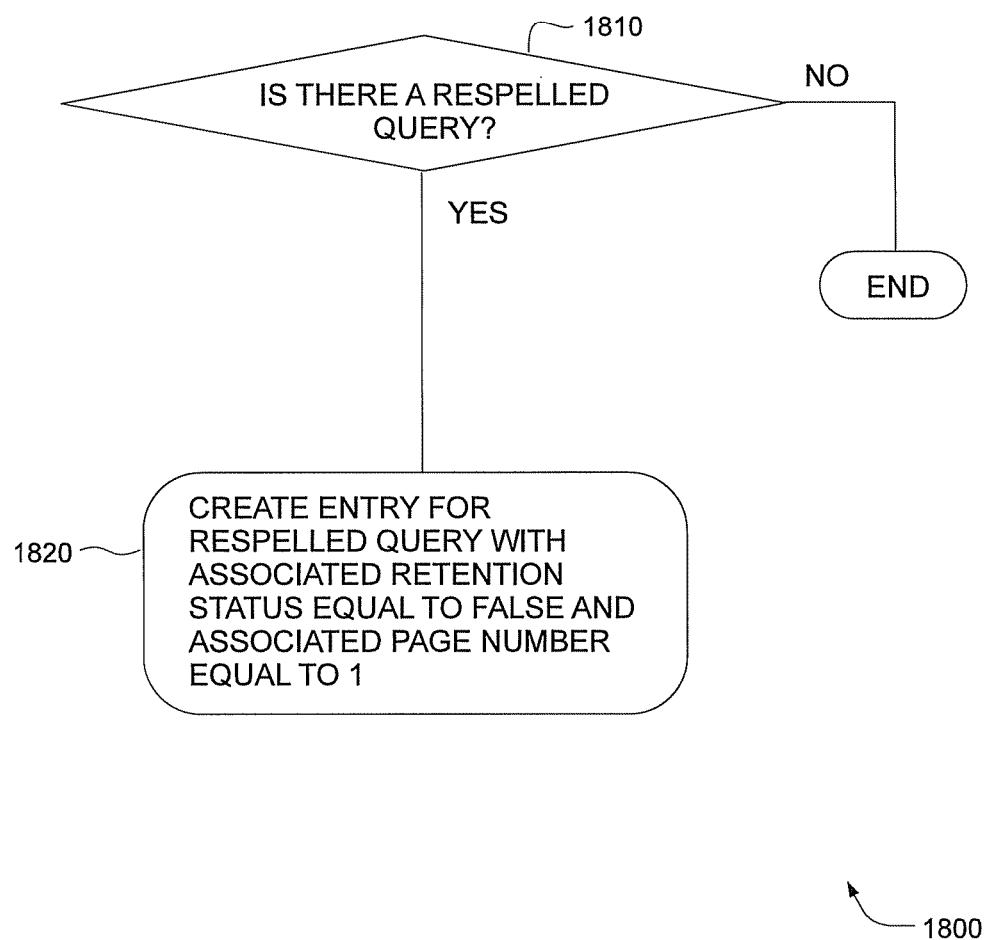
FIG. 18 is a flow diagram illustrating a process employed by a search application to handle a response from a back-end to a request for a spelling suggestion, according to one embodiment.

FIG. 18 is a flow diagram generally illustrating one embodiment of a process 1800 employed by search application 162 when a response is received from search back-end 140 to a message sent at 1260 of process 1200, process 1200 having been used to handle a submission of a query, the response from search back-end 140 providing a set of respellings of the submitted query containing, at most, one respelled query.

At 1810, search application 162 checks if the set of respelled queries contains a respelled query. If so, search application 162 proceeds to 1820. Otherwise, process 1800 terminates. At 1820, search application 162 creates an entry in left panel 230 for the respelled query, the entry having an associated retention status data item 420 equal to "false: and an associated page number data item 450 equal to "1".

In one embodiment, search application 162 prefetches from search back-end 140 the first page of the result set of the respelled query. Search back-end 140 provides an estimate of the number of results in the result set, and the first page if the estimate is not zero. In such an embodiment, search application 162 associates the estimate of the number of results obtained from search back-end 140 with the left panel entry created at 1820 as the data item 430, which results in the estimate being displayed in the entry. In such an embodiment, search application 162 further creates a result-set container, making it not visible, associates the container with the entry as the data item 440, and lays out in the container either a message stating that there are no results, if the result-set is empty according to the estimate, or the first page and a navigation tool such as a page menu relative to the first page if the result set is not empty.

Figure 19:
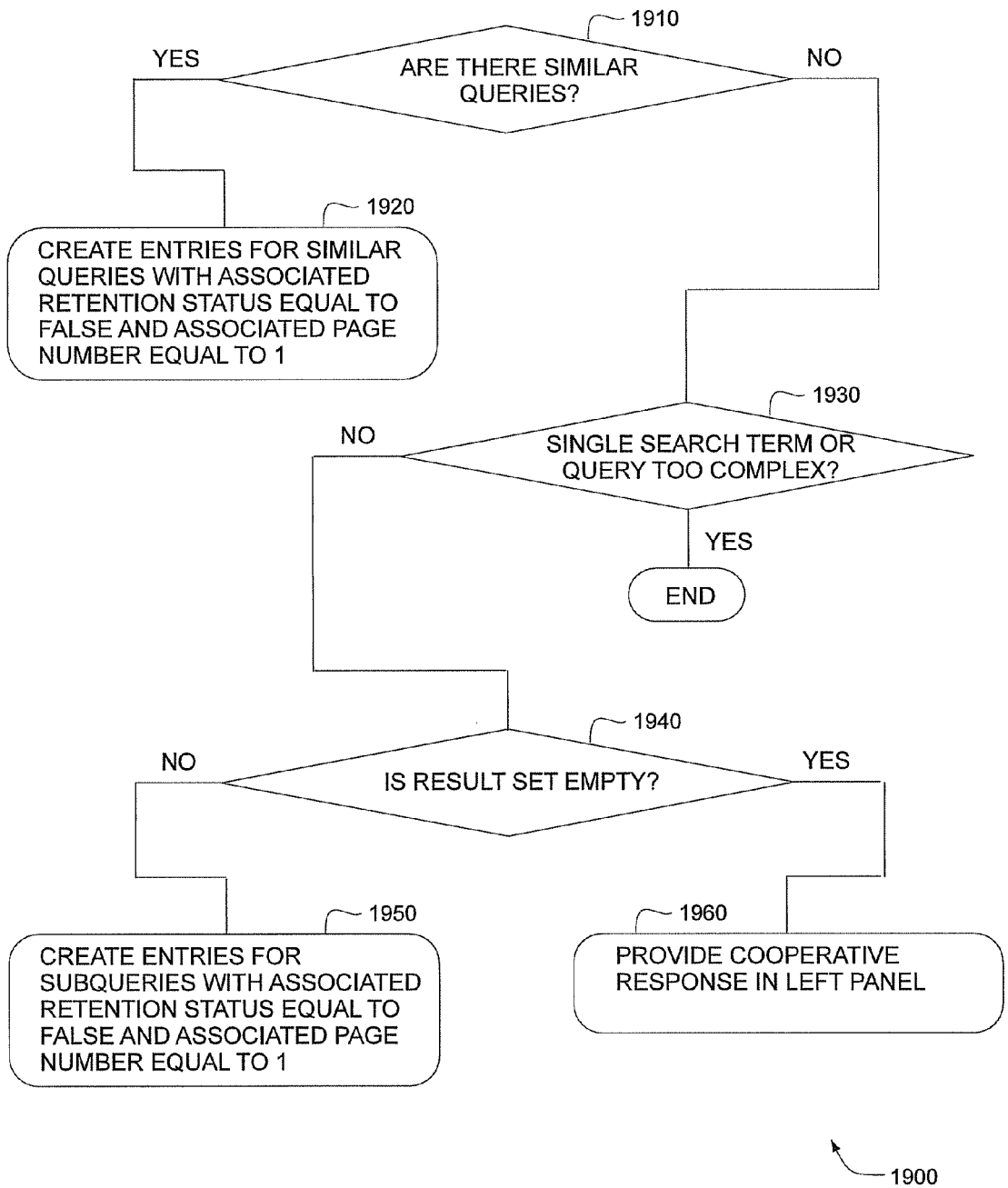
FIG. 19 is a flow diagram illustrating a process employed by a search application to handle a response from a back-end to a request for queries similar to a submitted query, according to one embodiment.

FIG. 19 is a flow diagram generally illustrating one embodiment of a process 1900 employed by search application 162 when a response is received from search back-end 140 to a message sent at 1260 of process 1200, process 1200 having been used to handle a submission of a query, the response from search back-end 140 providing a possibly empty set of queries similar to the submitted query. In one embodiment, where three separate messages are sent at 1260 of process 1200, responses to the three messages can be received in any order. However, process 1900, which handles the response to the third message, is delayed until the response to the first message has been received and handled by process 1700. Thus, process 1900 can rely on the assumption that process 1700 has been performed.

At 1910, search application 162 checks if the set of similar queries is empty or not empty. If the set is not empty, search application 162 proceeds to 1920. If the set is empty, search application 162 proceeds to 1930.

At 1920, search application 162 creates an entry in left panel 230 for each similar query, the entry having an associated retention status data item 420 equal to "false" and an associated page number data item 450 equal to "1". In one embodiment, search application 162 further prefetches from search back-end 140 the first page of the result set of the similar query. Search back-end 140 provides an estimate of the number of results in the result set, and the first page if the estimate is not zero. In such embodiment, search application 162 associates the estimate of the number of results obtained from search back-end 140 with the left panel entry created at 1920 as data item 430, which results in the estimate being displayed in the entry. In such an embodiment, search application 162 further creates a result-set container, making it not visible, associates the container with the entry as the data item 440, and lays out in the container either a message stating that there are no results, if the result-set is empty according to the estimate, or the first page and a navigation tool, such as a page menu relative to the first page, if the result set is not empty.

At 1930, search application 162 checks if the submitted query consists of a single search term or is overly complex. In one embodiment, the submitted query is deemed to be overly complex if it is a conjunctive query whose number of terms exceeds a limit, such as 6 or 7, for example. In one embodiment, the submitted query is further deemed to be overly complex if it is a disjunctive query whose number of terms exceeds the same limit. If the submitted query consists of a single search term or is overly complex, process 1900 terminates. Otherwise, search application 162 proceeds to 1940.

At 1940, search application 162 checks if the result set of the submitted query is empty or not empty, as determined at 1710 of process 1700. If the result set is not empty, search application 162 proceeds to 1950. If the result set is empty, search application 162 proceeds to 1960.

At 1950, search application 162 creates zero or more entries in left panel 230 for subqueries of the submitted query. In one embodiment, if the submitted query is a conjunctive query, the subqueries for which entries are created are the immediate conjunctive subqueries of the submitted query. In one embodiment, if the submitted query is a disjunctive query, the subqueries for which entries are created are the immediate disjunctive subqueries of the submitted query. For each of the subqueries, the created entry has an associated retention status data item 420 equal to "false" and an associated page number data item 450 equal to "1".

In one embodiment, search application 162 further prefetches from search back-end 140 the first page of the result set of the subquery. Search back-end 140 provides an estimate of the number of results in the result set, and the first page if the estimate is not zero. In such an embodiment, search application 162 associates the estimate of the number of results obtained from search back-end 140 with the left panel entry created at 1920 as data item 430, which results in the estimate being displayed in the entry. In such an embodiment, search application 162 further creates a result-set container, making it not visible, associates the container with the entry as data item 440, and lays out in the container either a message stating that there are no results, if the result-set is empty according to the estimate, or the first page and a navigation tool such as a page menu relative to the first page if the result set is not empty.

At 1960, search application 162 computes a cooperative response to the submitted query consisting of subqueries of the submitted query, and creates entries in the left panel for the subqueries, and associated result-set containers. According to one embodiment, the cooperative response is computed as described in the companion patent application cross-referenced above.

Figure 20:
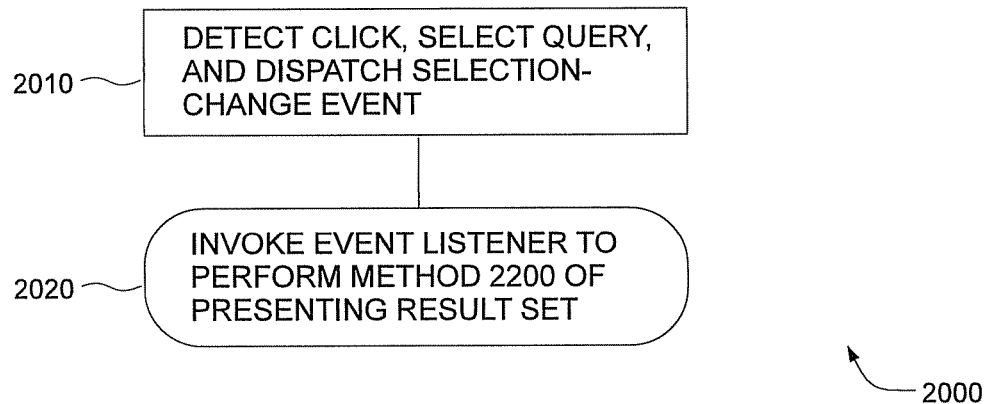
FIG. 20 is a flow diagram illustrating a process employed by a search application to display a result-set of a displayed query when a user selects the query by clicking on the query, according to one embodiment.

FIG. 20 is a flow diagram generally illustrating one embodiment of a process 2000 employed by search application 162 to display the result-set of a displayed query in center panel 240 when user 120 selects the query by clicking on the query, according to one embodiment where search application 162 is built on the Flex platform.

At 2010, search application 162 detects the click on the displayed query, selects the displayed query, and dispatches a selection-change event, which is performed by platform code rather than project code. Search application 162 then proceeds to 2020. At 2020, search application 162 uses a selection-change event listener invoked by the selection-change event dispatched at 2010 to perform a method 2200 of displaying the result set of the selected query, as described below in connection with FIG. 22.

Figure 21:
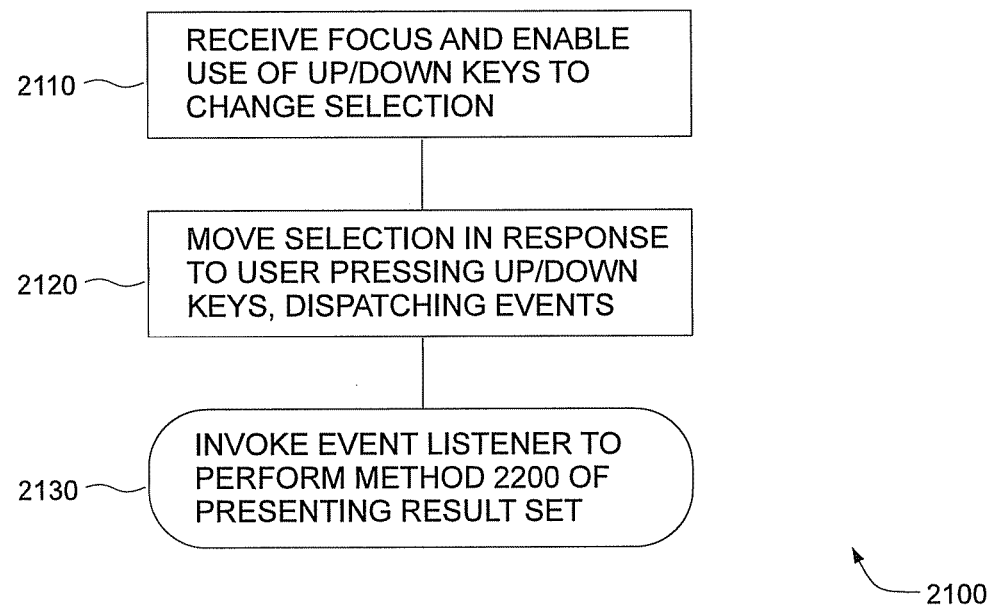
FIG. 21 is a flow diagram illustrating a process employed by a search application to display a result-set of a displayed query when a user selects the query using up/down keys, according to one embodiment.

FIG. 21 is a flow diagram generally illustrating one embodiment a process 2100 employed by search application 162, according to one embodiment, where search application 162 is built on the Flex platform, to present the result-set of a displayed query in center panel 240 when user 120 brings keyboard focus to left panel 230 control and then uses up/down keys 192, 194 to move the selection until the displayed query is selected.

At 2110, search application 162 reacts to user 120 bringing keyboard focus to the left panel 230 control, enabling the use of up/down keys 192, 194 to change the selection, which is performed by platform code rather than project code. Search application 162 then proceeds to 2120.

At 2120, search application 162 moves the selection in response to user 120 pressing up/down keys 192, 194 until the displayed query is selected. A selection-change event is dispatched each time user 120 presses one of up/down keys 192, 194. Again, 2120 is performed by platform code rather than project code. Search application 162 then proceeds to 2130.

At 2130, search application 162 uses a selection-change event listener invoked by the last selection-change event dispatched at step 2120 to perform method 2200 described below in connection with FIG. 22 to display the result set of the selected query. (Earlier selection-changed dispatched as the user is moving the selection also cause method 2200 to be performed, for displayed queries selected earlier.)

Figure 22:
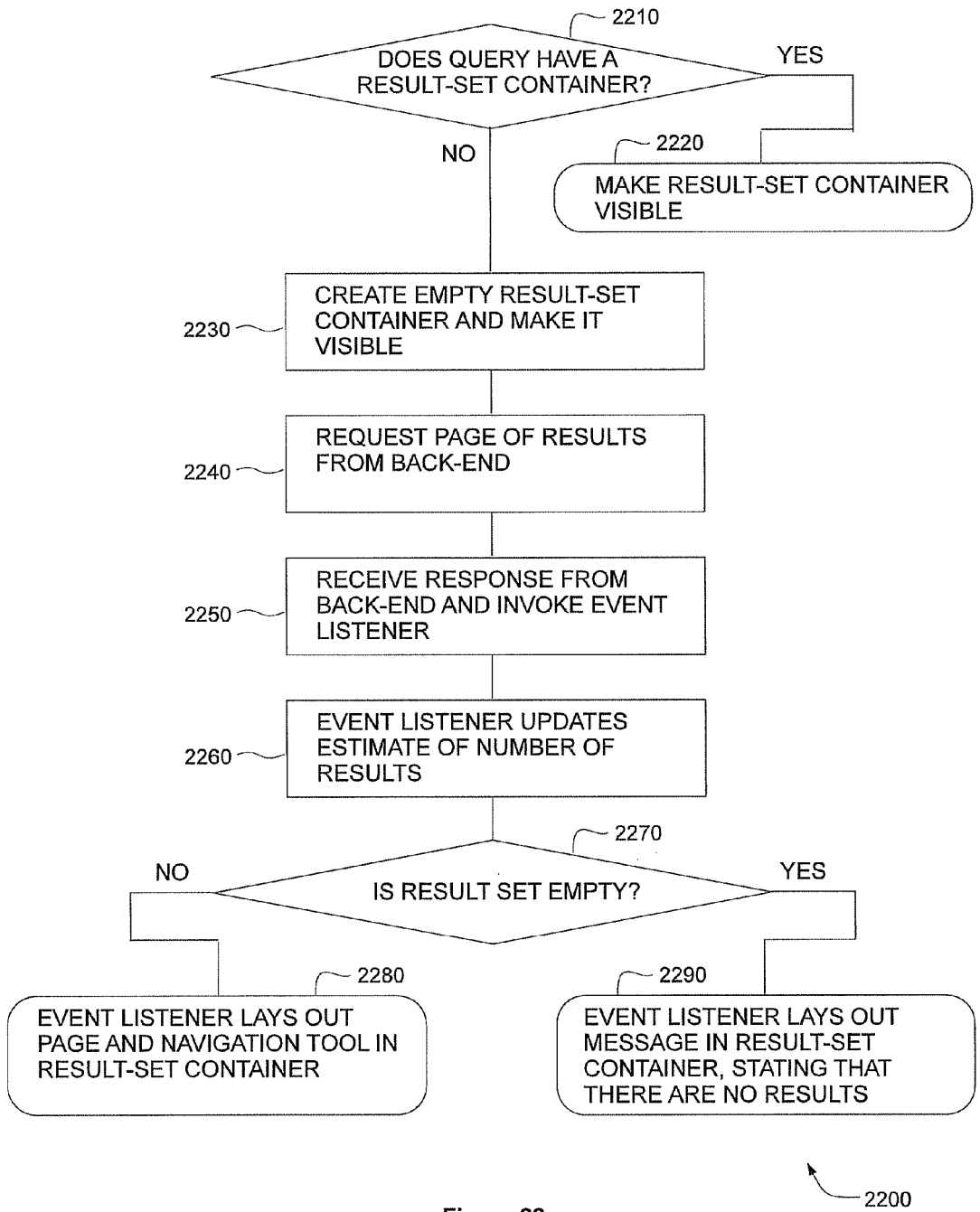
FIG. 22 is a flow diagram illustrating a process employed by a search application to display a result-set of a displayed query using a result-set container, according to one embodiment.

FIG. 22 is a flow diagram generally illustrating one embodiment of a process 2200 employed by search application 162 when a displayed query is selected in left panel 230 to present the result set of the selected query in center panel 240 using a result-set container, according to one embodiment, where search application 162 is built on the Flex platform.

At 2210, search application 162 checks if the selected displayed query has an associated result-set container data item 440. If so, search application 162 proceeds to 2220. Otherwise, search application 162 proceeds to 2230. At 2220, search application 162 checks if there is another result-set container nested in the center panel that is currently visible and, if so, makes the other container invisible. Search application 162 then makes the associated result-set container visible.

At 2230, search application 162 creates an empty result-set container, checks if there is another result-set container nested in the center panel that is currently visible and, if so, makes the other container invisible, makes the empty result-set container visible, and associates the empty result-set container with the displayed query as data item 440.

At 2240, search application 162 uses the network interface 142 to convey the query to search back-end 140 and requests the page of the result set of the query identified by the page number data item 450 associated with the displayed query. At 2250, search application 162 receives a response from search back-end 140 containing an estimate of the number of results in the result set of the query and, if the estimate is not zero, the requested page, and invokes an event listener to handle the response and perform the remaining portions of process 2200. Search application 162 then proceeds to 2260.

At 2260, the event listener uses the estimate to update data item 430 associated with the displayed query (if necessary), causing the estimate to be updated on the display, and proceeds to 2270. At 2270, the event listener checks if the estimate is zero, which means that the result set is empty. If the result set is not empty, search application 162 proceeds to 2280. If the result set is empty, search application 162 proceeds to 2290.

At 2280, search application 162 lays out the page received from search back-end 140 in area 510 of the result-set container created at 2230, and a navigation tool, such as a page menu for the result set, relative to the page, in area 520 of the container. At 2290, search application 162 lays out a message in the created result-set container, stating that there are no results for the selected displayed query.

Figure 23:
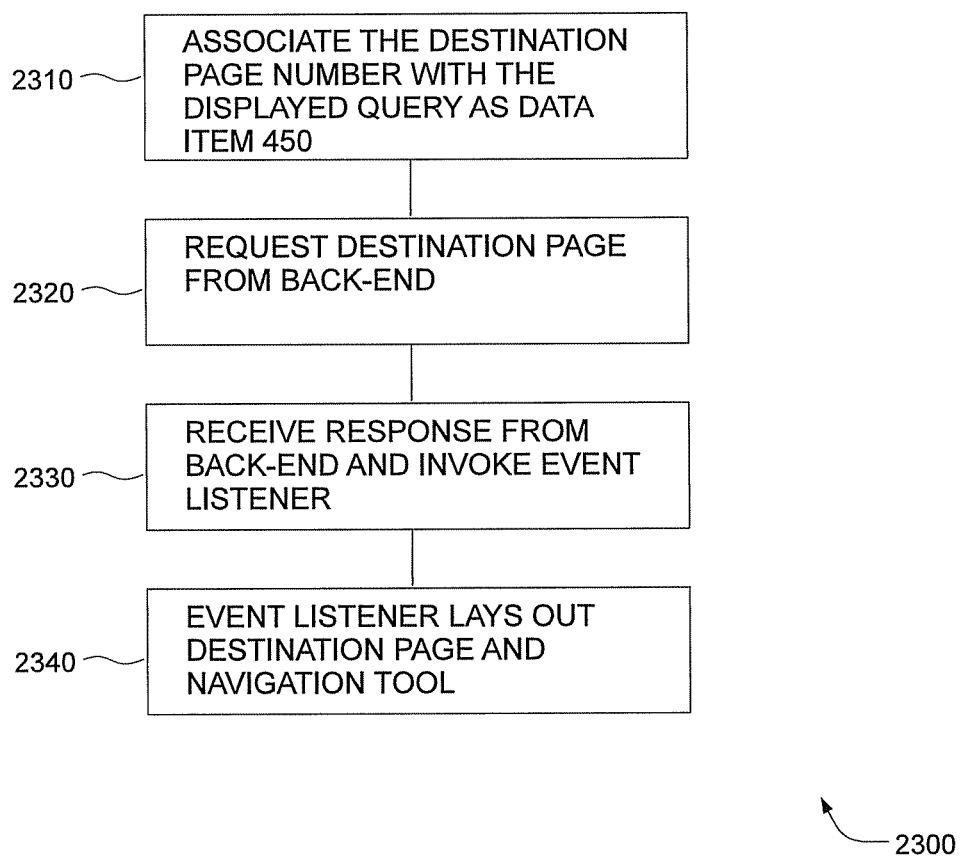
FIG. 23 is a flow diagram illustrating a process employed by a search application to visit a destination page specified using a navigation tool, according to one embodiment.

FIG. 23 is a flow diagram generally illustrating one embodiment of a process 2300 employed by search application 162 when user 120 uses a navigation tool of a result set of a displayed query to visit a corresponding destination page of the result set, the navigation tool being displayed in the area 520 of the result-set container associated with the displayed query as data item 440. In one embodiment, the navigation tool is a page menu.

At 2310, search application associates the destination page number with the displayed query as data item 450, and proceeds to 2320. At 2320, search application 162 uses network interface 142 to convey the query to search back-end 140 and request the destination page. Search application 162 then proceeds to 2330.

At 2330, search application 162 receives a response from search back-end 140 containing the destination page and invokes an event listener to handle the response and perform the remaining step of the process 2300. Search application 162 then proceeds to 2340. At 2340, the event listener lays out the destination page in area 510 of the result-set container, and a navigation tool for the result set relative to the destination page in area 520 of the container. In one embodiment, the navigation tool is a page menu.

It should now be apparent that the page number data item 450 associated with a displayed query is the last visited page of the result set of the query, if the displayed query has ever been selected so that one of its pages has been visited. Indeed, user 120 can visit a page by selecting the displayed query and thus making visible a result-set container associated with the query, the page being already displayed in the container, or by navigating to the page after the result-set container has been made visible.

When user 120 selects the displayed query, search application 162 performs process 2200. If the displayed query does not have a result-set container, process 2200 creates one and displays in it precisely the page that is identified by the page number data item 450, the page being requested from search back-end 140 at 2240. If the displayed query already has a result-set container, process 2200 simply makes the result-set container visible; which does not change the page number 450 nor the page being visited. When user 120 visits a page by navigating to the page, search application 162 performs the process 2300, and at 2310, associates the visited page with the displayed query as data item 450.

In one embodiment, where search back-end 140 is provided by Yahoo Inc, search application 162 quotes single words used as search terms before conveying a query to search back-end 140 and requesting a page of the result set of the query, to prevent the back-end from including results in its response that belong to the result set of a respelling of the query rather than to the result set of the query.

In one embodiment, where search back-end 140 is provided by Yahoo Inc, only a portion of the results of a result set are made available through the network interface 142, the available results being called the "most relevant results" while the entirety of the result set is referred to as "the deep hits" in search engine jargon. In such embodiment, the estimate of the number of results shown in left panel 230 is an estimate of the number of deep hits, but the page menu in center panel 240 is constructed based on the number of "most relevant results".

It should now be apparent that the embodiments described herein enable user 120 to interleave the browsing of the result sets of the queries displayed in left panel 230 without having to retype the queries and without backtracking User 120 can select a query and browse its result set. User 120 can interrupt the browsing and later resume the browsing by reselecting the query, after having browsed the result sets of other queries in the meantime. In some embodiments, when user 120 reselects the query, browsing resumes at the same page and same scrolling position, i.e. center panel 230 displays the page that was displayed when browsing was interrupted, at the same scrolling position that the page had when the browsing was interrupted. Furthermore, in some embodiments, browsing resumes at the same page and scrolling position even after the application has exited and restarted.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of facilitating the browsing of result sets of search queries by a user, comprising:
    displaying in a first area of a computer display a set of queries comprising a plurality of queries, each query having a corresponding result set comprising one or more results pages, each results page comprising a range of consecutive results, one of the queries being selected among those displayed in the first area, the selected query being highlighted;
    providing the user with a user interface procedure for submitting an additional query and augmenting the set of queries displayed in the first area with an incremental set of queries, the incremental set comprising at least the additional query, the user interface procedure comprising entering the additional query in a query box and hitting a submission key on a keyboard;
    providing the user with a navigation tool for visiting results pages of the result set of the selected query, each visited page being displayed in a second area of the display;
    providing the user with a user-interface procedure for selecting a different query in the first area; and
    when a query displayed in the first area becomes selected again, after having been selected earlier and one or more other queries having been selected in the interim, using a page number stored in a storage facility to recall which results page of the result set of the selected-again query was last visited while the query was last selected, and automatically displaying the last visited results page in the second area without further user interaction.

2. The method of claim 1, wherein the last visited page of the selected-again query is displayed at a scrolling position that is the same as the position to which the page was last scrolled when it was last visited while the query was last selected.

3. The method of claim 1, wherein the user interface procedure for selecting a different query comprises clicking on the different query.

4. The method of claim 1, wherein the user interface procedure for selecting a different query in the first area comprises using up/down keys on a keyboard after bringing keyboard focus to the first area.

5. The method of claim 1, wherein the navigation tool comprises a page menu.

6. The method of claim 1, wherein the user interface procedure for submitting the additional query further comprises entering the query in a query box and clicking on a button.

7. The method of claim 1, wherein the additional query is one of the queries displayed in the first area and the user interface procedure for submitting the additional query comprises dragging the query to a query box.

8. The method of claim 1, wherein the additional query is one of the queries displayed in the first area and the user interface procedure for submitting the additional query comprises double-clicking on the displayed query.

9. The method of claim 1, wherein the incremental set further comprises a respelling of the additional query.

10. The method of claim 1, wherein the incremental set further comprises at least one query deemed similar by a search back-end to the additional query.

11. The method of claim 1, wherein the incremental set further comprises a subquery of the additional query.

12. The method of claim 1, wherein the additional query is a conjunctive query and the incremental set further comprises one or more conjunctive subqueries of the conjunctive query.

13. The method of claim 1, wherein the additional query is a disjunctive query and the incremental set further comprises one or more disjunctive subqueries of the disjunctive query.

14. The method of claim 1, wherein the additional query has an empty result set and the incremental set further comprises a group of queries that together constitute a cooperative response to the additional query.

15. The method of claim 1, wherein each query in the first area has a Boolean retention status modifiable by the user, the method further comprising, as an additional response to the user submitting the additional query, removing from the first area those queries that have a retention status equal to false.

16. The method of claim 15, further comprising setting to false the retention status of the queries in the incremental set after removing from the first area those queries that have a retention status equal to false.

17. A system comprising:
a computer having a computer display and a storage facility; and
a search application stored in the storage facility, programmed to perform a method of facilitating the browsing of result sets of search queries by a user, the method comprising:
displaying in a first area of a computer display a set of queries comprising a plurality of queries, each query having a corresponding result set comprising one or more results pages, each results page comprising a range of consecutive results, one of the queries being selected among those displayed in the first area, the selected query being highlighted;
providing the user with a user interface procedure for submitting an additional query and augmenting the set of queries displayed in the first area with an incremental set of queries, the incremental set comprising at least the additional query, the user interface procedure comprising entering the additional query in a query box and hitting a submission key on a keyboard;
providing the user with a navigation tool for visiting results pages of the result set of the selected query, each visited page being displayed in a second area of the display;
providing the user with a user-interface procedure for selecting a different query in the first area; and
when a query displayed in the first area becomes selected again, after having been selected earlier and one or more other queries having been selected in the interim, using a page number stored in the storage facility to recall which results page of the result set of the selected-again query was last visited while the query was last selected, and automatically displaying the last visited results page in the second area without further user interaction.

18. The system of claim 17, wherein the last visited page of the selected-again query is displayed at a scrolling position that is the same as the position to which the page was last scrolled when it was last visited while the query was last selected.

19. The system of claim 17, further comprising a search back-end containing an index into a collection of documents, the result sets of the displayed queries being relative to the collection of documents and being defined by the index, the computer accessing the search back-end over a network and obtaining results pages from the search back-end using a network interface.

20. The system of claim 19 wherein the network interface comprises a Hypertext Transfer Protocol (HTTP) based interface.

21. The system of claim 20 wherein the network is the Internet.

22. The system of claim 21, wherein the collection of documents is a collection of files reachable on the World Wide Web.

23. The system of claim 17, wherein the storage facility includes a persistent memory and the method performed by the search application further comprises:
saving to the persistent memory, when the search application exits, data comprising the queries displayed in the first area and a page number of a last visited results page of each query displayed in the first area that has been selected in the course of the search application performing the programmed method; and
reading back said data from the persistent memory when the search application restarts, thereby preserving said data while the search application is not running.

24. A search application stored in a storage facility, programmed to perform a method of facilitating the browsing of result sets of search queries by a user, the method comprising:
displaying in a first area of a computer display a set of queries comprising a plurality of queries, each query having a corresponding result set comprising one or more results pages, each results page comprising a range of consecutive results, one of the queries being selected among those displayed in the first area, the selected query being highlighted;
providing the user with a user interface procedure for submitting an additional query and augmenting the set of queries displayed in the first area with an incremental set of queries, the incremental set comprising at least the additional query, the user interface procedure comprising entering the additional query in a query box and hitting a submission key on a keyboard;
providing the user with a navigation tool for visiting results pages of the result set of the selected query, each visited page being displayed in a second area of the display;
providing the user with a user-interface procedure for selecting a different query in the first area; and
when a query displayed in the first area becomes selected again, after having been selected earlier and one or more other queries having been selected in the interim, using a page number stored in the storage facility to recall which results page of the result set of the selected-again query was last visited while the query was last selected, and automatically displaying the last visited results page in the second area without further user interaction.

25. The search application of claim 24, wherein the last visited page of the selected-again query is displayed at a scrolling position that is the same as the position to which the page was last scrolled when it was last visited while the query was last selected.

26. A non-transitory computer readable storage device storing a search application containing executable instructions for controlling a computer system including a computer display and a storage facility to perform a method of facilitating the browsing of result sets of search queries by a user, the method comprising:

displaying in a first area of a computer display a set of queries comprising a plurality of queries, each query having a corresponding result set comprising one or more results pages, each results page comprising a range of consecutive results, one of the queries being selected among those displayed in the first area, the selected query being highlighted;

providing the user with a user interface procedure for submitting an additional query and augmenting the set of queries displayed in the first area with an incremental set of queries, the incremental set comprising at least the additional query, the user interface procedure comprising entering the additional query in a query box and hitting a submission key on a keyboard;

providing the user with a navigation tool for visiting results pages of the result set of the selected query, each visited page being displayed in a second area of the display;

providing the user with a user-interface procedure for selecting a different query in the first area; and when a query displayed in the first area becomes selected again, after having been selected earlier and one or more other queries having been selected in the interim, using a page number stored in the storage facility to recall which results page of the result set of the selected-again query was last visited while the query was last selected, and automatically displaying the last visited results page in the second area without further user interaction.

27. The non-transitory computer readable storage device of claim 26, wherein displaying the last visited page of the selected-again query includes scrolling the page to a position that is the same as the position to which the page was last scrolled when it was last visited while the query was last selected.

* * * * *